(12) United States Patent
Odate et al.

(10) Patent No.: US 8,977,157 B2
(45) Date of Patent: Mar. 10, 2015

(54) SWITCHING POWER SUPPLY

(75) Inventors: Takashi Odate, Tokyo (JP); Keisuke Samejima, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 239 days.

(21) Appl. No.: 13/474,329

(22) Filed: May 17, 2012

(65) Prior Publication Data
US 2012/0301172 A1 Nov. 29, 2012

(30) Foreign Application Priority Data
May 24, 2011 (JP) ................................. 2011-115860

(51) Int. Cl.
*G03G 15/00* (2006.01)
*H02M 1/00* (2006.01)

(52) U.S. Cl.
CPC ....... *G03G 15/80* (2013.01); *H02M 2001/0006* (2013.01)
USPC .......................................................... 399/88

(58) Field of Classification Search
USPC ......................................... 399/88; 363/21.01
See application file for complete search history.

(56) References Cited

U.S. PATENT DOCUMENTS

| | | | | |
|---|---|---|---|---|
| 2010/0238688 A1* | 9/2010 | Samejima | ................. | 363/21.01 |
| 2011/0187192 A1* | 8/2011 | Choi | ............................... | 307/31 |
| 2011/0311260 A1* | 12/2011 | Nakajima et al. | ............... | 399/88 |

FOREIGN PATENT DOCUMENTS

| | | |
|---|---|---|
| JP | 2000-148265 A | 5/2000 |
| KR | 10-2010-0069581 A | 6/2010 |
| KR | 10-2010-0105419 A | 9/2010 |

* cited by examiner

*Primary Examiner* — Quana M Grainger
(74) *Attorney, Agent, or Firm* — Canon U.S.A., Inc., IP Division

(57) ABSTRACT

A switching power supply includes a transformer, a switching unit configured to switch a voltage input to the primary side of the transformer, a control unit configured to control the operation of the switching unit, and a detection unit configured to detect as a voltage a current flowing through the primary side of the transformer and supply the voltage to the control unit, wherein the detection unit controls the voltage to be supplied to the control unit based on the operating state of the switching unit.

15 Claims, 25 Drawing Sheets

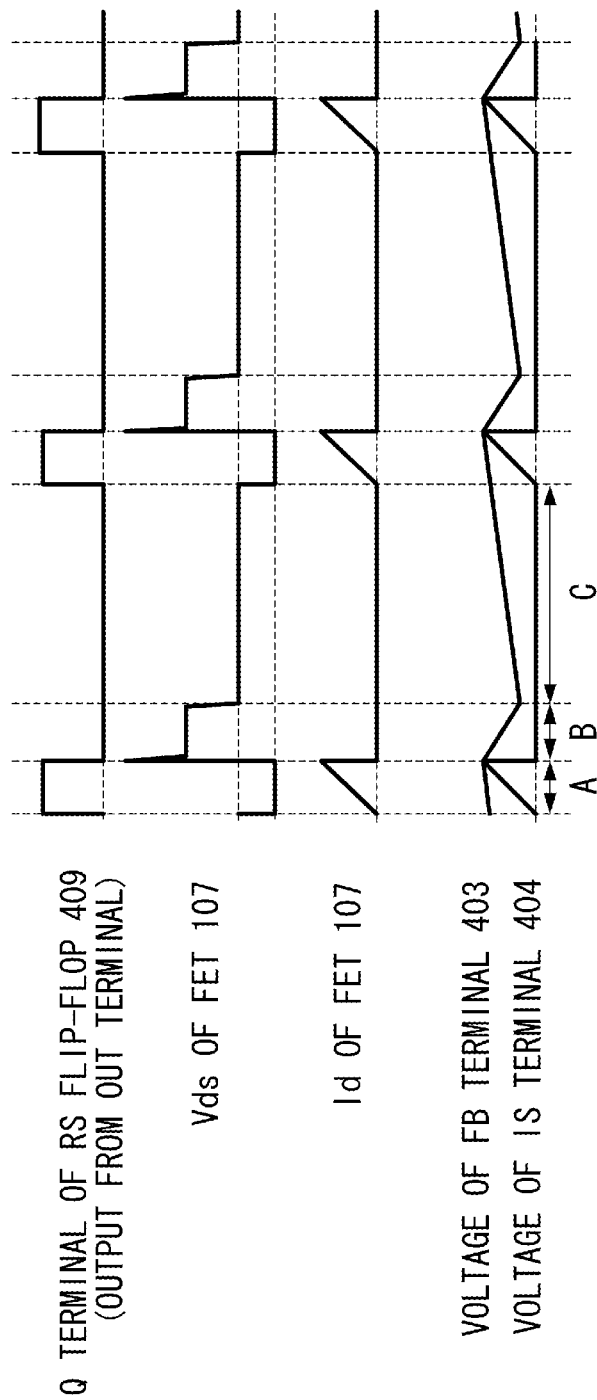

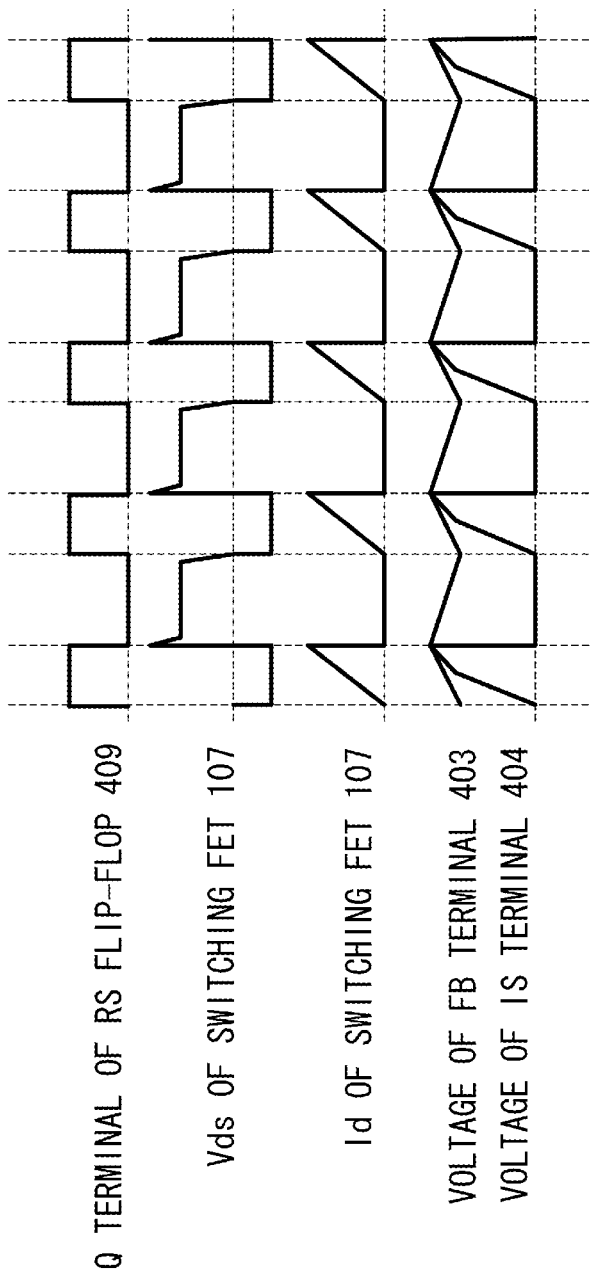

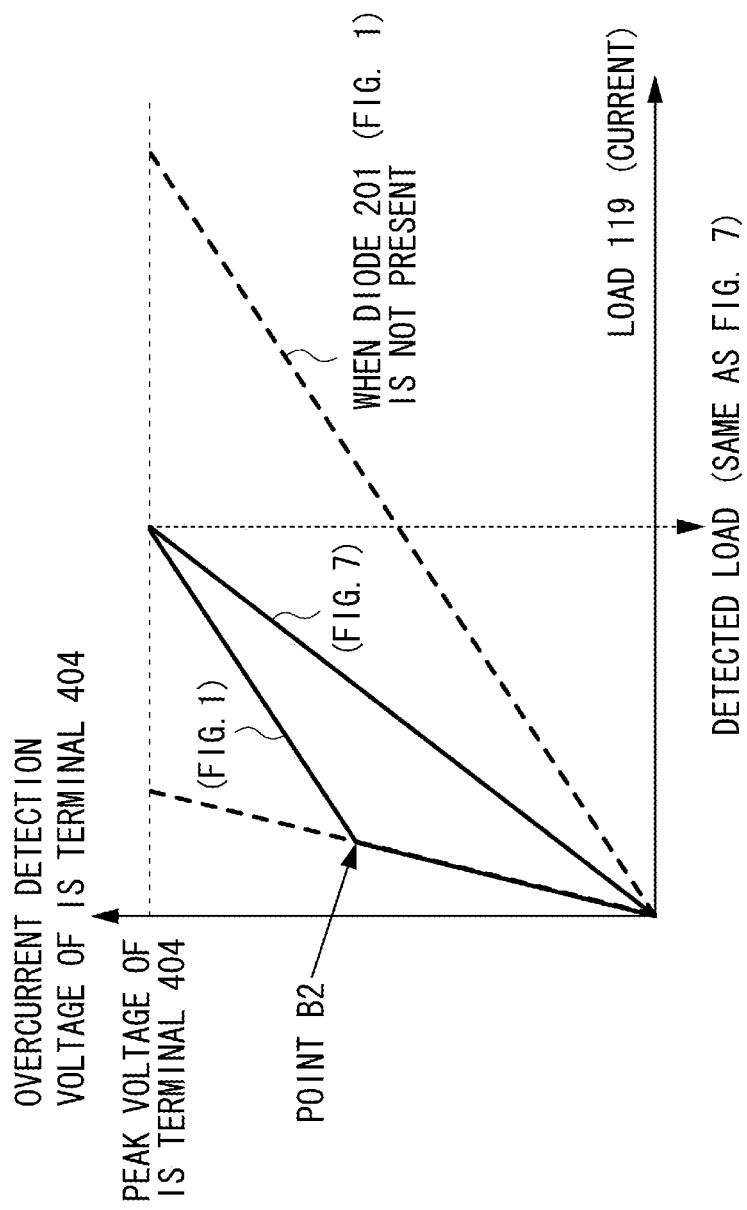

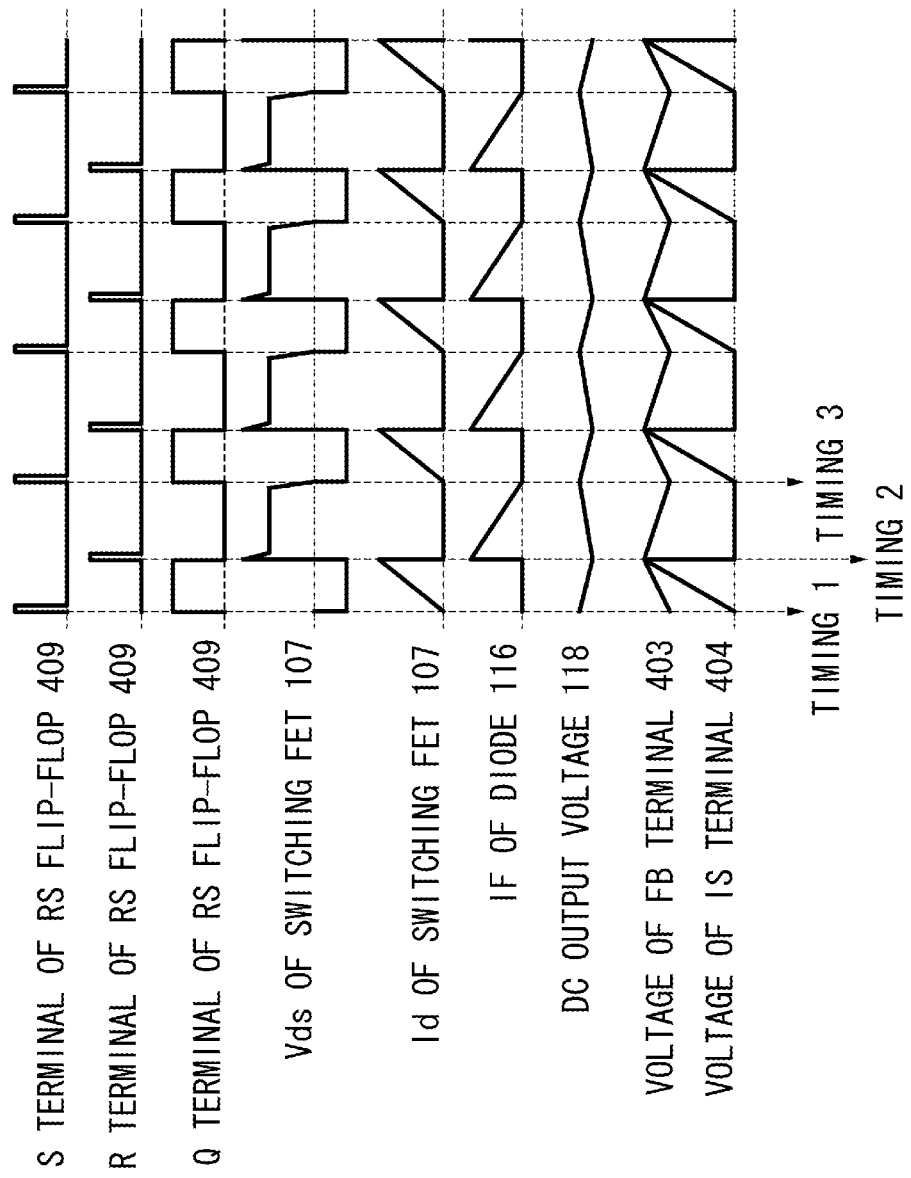

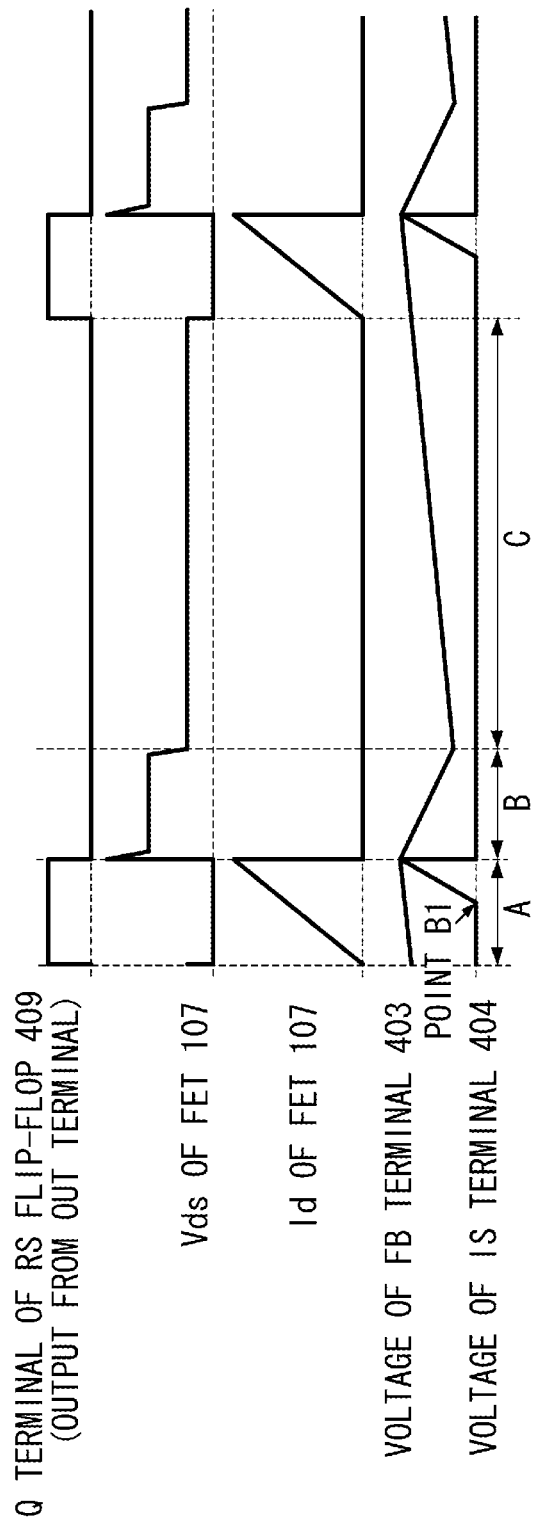

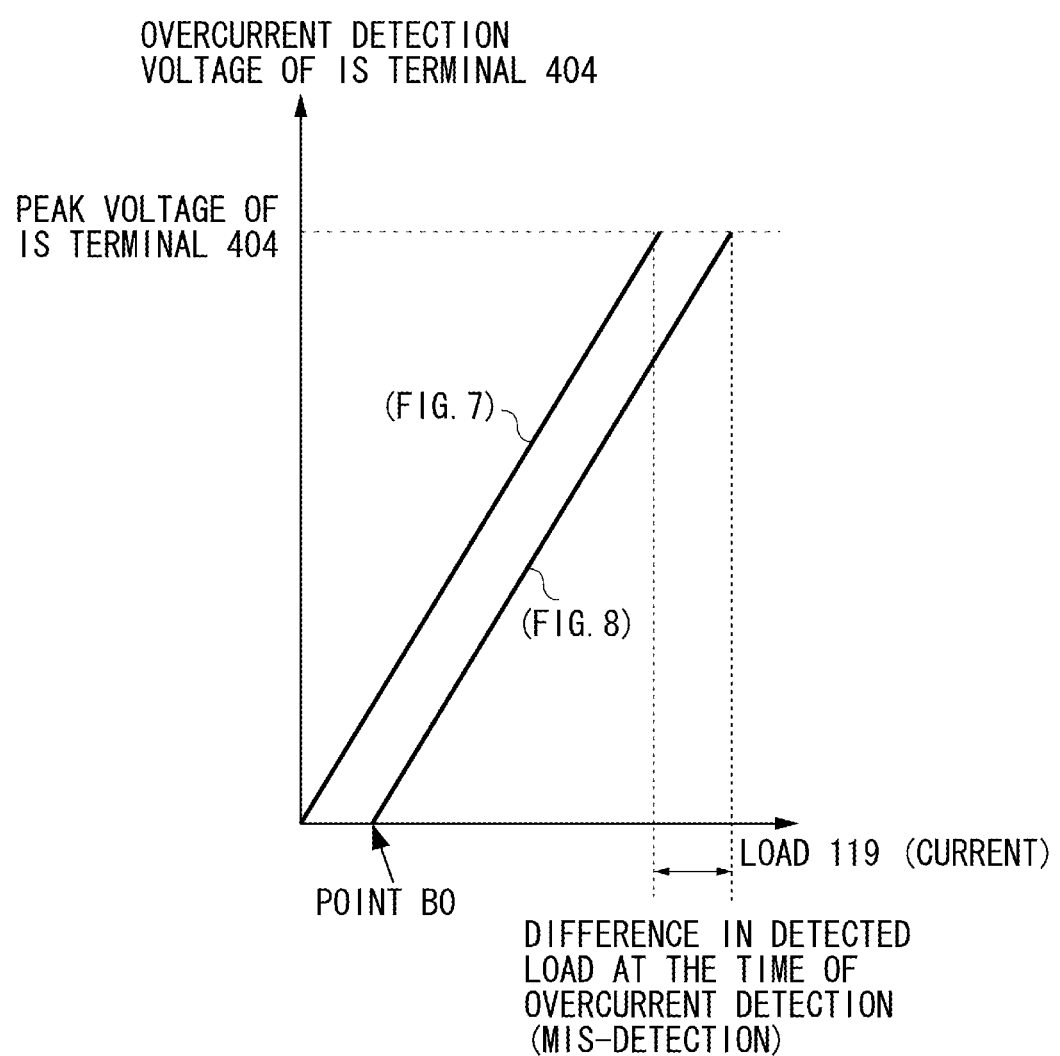

SWITCHING POWER SUPPLY

BACKGROUND OF THE INVENTION

1. Field of the Invention

The present invention relates to a switching power supply which outputs a direct current (DC) voltage.

2. Description of the Related Art

With a conventional flyback-type switching power supply, the switching operation of a switching element such as a field effect transistor (FET) for switching the primary side voltage of a transformer is controlled as follows. For example, the ON/OFF operation of the FET is controlled based on the secondary side voltage of the transformer, the voltage corresponding to the current flowing through the FET, and the voltage between the drain and source of the FET. To control this operation, an integrated circuit (IC) dedicated for switching operation control is used. Specifically, the FET is turned ON when the secondary side voltage exceeds a first reference voltage and the voltage between the drain and source of the FET is a second reference voltage or below. The FET is turned OFF when the secondary side voltage is lower than the voltage corresponding to the current flowing through the FET. Such a switching power supply uses a technique for reducing the power consumption at the time of light loading by shortening a period during which the FET is turned ON in the light load state (Japanese Patent Application Laid-Open No. 2000-148265).

In recent years, reducing the power consumption in the light load state has become one of problems for equipment mounted with a switching power supply. For example, by further reducing power consumption of the equipment mounted with the switching power supply in the light load state (also referred to as operation standby state), equipment having lower power consumption than conventional equipment can be provided. Particularly in the operation standby or non-operating state, in many cases, a power supply source such as a switching power supply consumes the most amount of power in an apparatus. Therefore, the necessity of further reducing power consumption of the switching power supply in the light load state is increasing.

One of factors which prevents the reduction in power consumption of the switching power supply in the light load state is switching loss of the FET (switching element). A possible method for reducing switching loss of the FET is to increase the amount of current to be sent to the FET while it is ON to reduce the number of switching operations per unit time.

However, increasing the amount of current to be sent to the switching element while it is ON to reduce the number of switching operations causes a problem that the transformer generates a beat sound. When the number of switching operations is reduced to increase the amount of current to be sent to the switching element while it is ON, a beat sound of the transformer increases. Specifically, when attempting to reduce switching loss in the light load state, a beat sound of the transformer is generated, which is harsh sound for a user. In the light load state in many cases, since the equipment is not operating, a beat sound is easily heard by the user.

SUMMARY OF THE INVENTION

The present invention enables reducing a beat sound generated by a transformer of a switching power supply in the light load state.

According to an aspect of the present invention, a switching power supply includes a transformer configured to convert an input voltage, a switching unit configured to switch a voltage input to the primary side of the transformer, a control unit configured to control the operation of the switching unit, and a detection unit configured to detect as a voltage a current flowing through the primary side of the transformer and supply the voltage to the control unit, wherein the detection unit controls the voltage to be supplied to the control unit based on the operating state of the switching unit.

According to another aspect of the present invention, an image forming apparatus includes an image forming unit configured to form an image on a recording material, a controller configured to control the operation of the image forming unit, and a switching power supply configured to output a voltage to the controller, wherein the switching power supply comprises: a transformer configured to convert an input voltage, a switching unit configured to perform switching on a voltage input to the primary side of the transformer, a control unit configured to control the operation of the switching unit, and a detection unit configured to detect as a voltage a current flowing through the primary side of the transformer and supply the voltage to the control unit, and wherein the detection unit controls the voltage to be supplied to the control unit based on the operating state of the switching unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2A illustrates operation waveforms.

FIG. 3A illustrates operation waveforms.

FIG. 4 illustrates a voltage waveform input to the IS terminal of the power supply IC in the overload state according to the first exemplary embodiment of the present invention.

FIG. 8 illustrates operation waveforms of the switching power supply illustrated in FIG. 7A.

FIGS. 10A and 10B illustrate operation waveforms of the circuits in FIGS. 7 and 9 at the time of intermittent oscillation.

FIG. 11 illustrates a load difference when overcurrent is detected.

DESCRIPTION OF THE EMBODIMENTS

Various exemplary embodiments, features, and aspects of the invention will be described in detail below with reference to the drawings.

The configuration and operation of a switching power supply according to the present invention will be described below. The following exemplary embodiments are illustrative and the technical scope of the present invention is not limited thereto.

A generating mechanism of a transformer beat sound of the switching power supply in the light load state (requisite for the present invention) will be described below.

Figure 13:
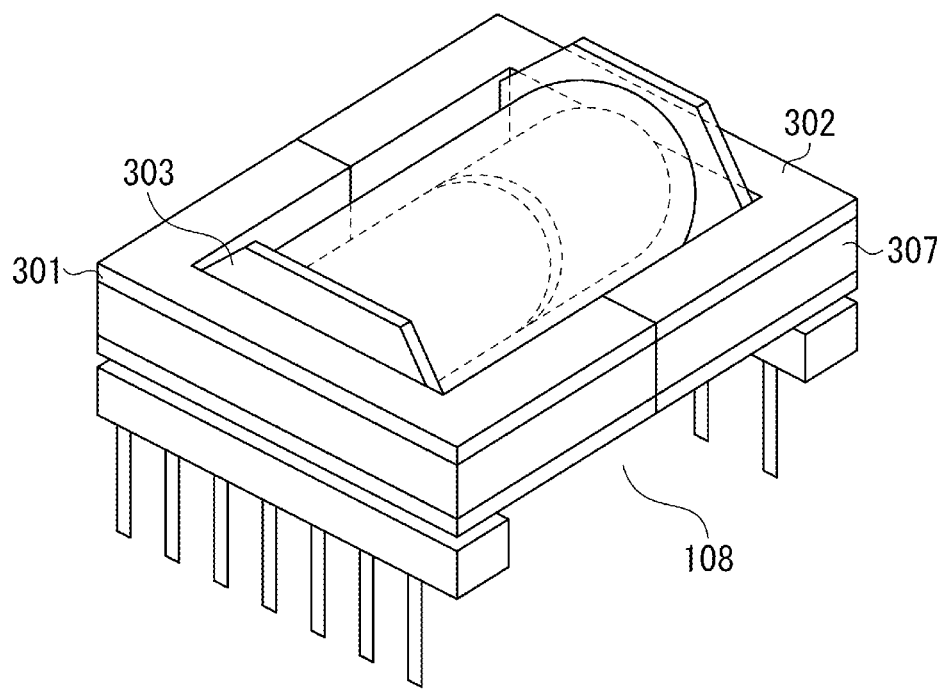
FIG. 13 illustrates a configuration of a transformer.
Figure 14:
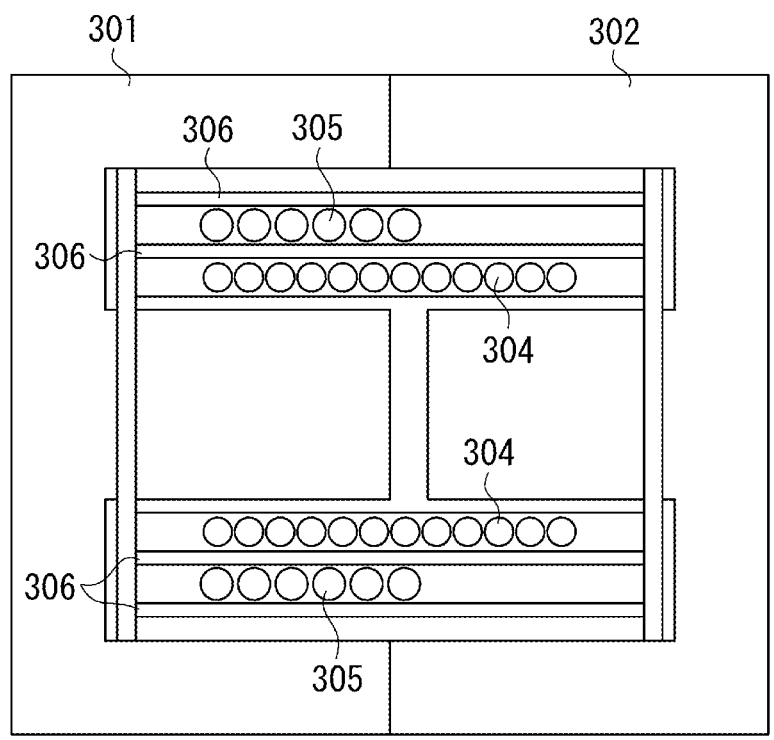
FIG. 14 is a perspective view illustrating the transformer when viewed from the top.

FIG. 13 illustrates a structure of a transformer 108. FIG. 14 is a perspective view of the transformer 108 when viewed from the top. Referring to FIGS. 13 and 14, the transformer 108 is provided with ferrite cores 301 and 302, a coil bobbin 303, a primary winding 304, a secondary winding 305, interlaminar paper 306, and a tape 307. A gap is provided at a central magnetic leg. Procedures for assembling the transformer 108 will be described below. First, the windings 304 and 305 and the interlaminar paper 306 are wound around the coil bobbin 303. After performing terminal processing, the ferrite cores 301 and 302 are inserted into the coil bobbin 303. Then, the tape 307 is wound around the outer circumference portion to fix the cores 301 and 302. Then, the transformer 108 is impregnated with varnish which is generally unsaturated polyester resin, modified polyester resin, or alkyd resin. Specifically, the transformer 108 is impregnated with such varnish (dip) in a tub for a predetermined time period with terminals up. The varnish is maintained at high temperature for several hours to solidify the varnish. Thus, in the course of the above-described varnish impregnation processing, the varnish sinks into gaps between the cores 301 and 302, between the cores 301 and 302 and the coil bobbin 303, between the windings 304 and 305, and the interlaminar paper 306, and then becomes solidified to unite these components.

Figure 15:
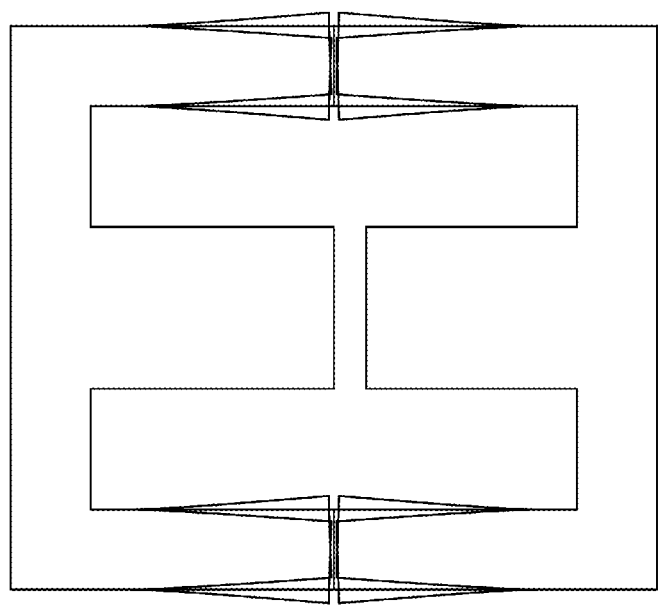
FIG. 15 illustrates deformations of the transformer.
Figure 17A:
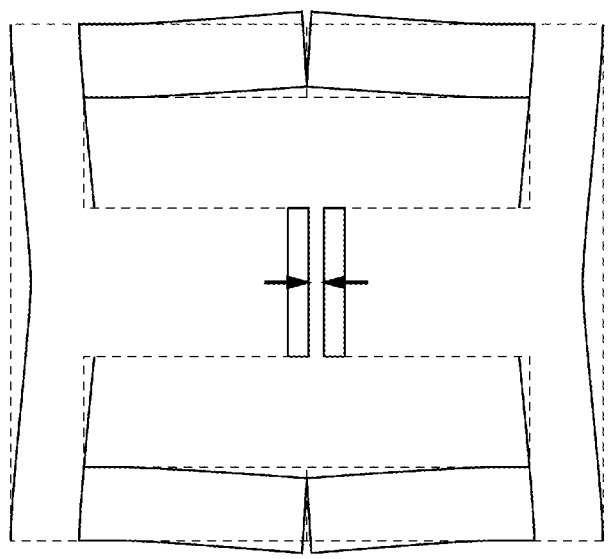
FIGS. 17A and 17B illustrate deformations of cores by electromagnetic force.

However, the transformer 108 that has undergone the varnish impregnation processing has variation in varnish impregnation conditions. For example, if the varnish has reached the central magnetic legs, so that mating central magnetic legs (facing each other) are closely stuck to each other, the transformer 108 generates a small beat sound. Otherwise, if the varnish has not reached the central magnetic legs, the transformer 108 generates a large beat sound. If mating outer magnetic legs are not closely stuck to each other, friction between the outer magnetic legs occurs as illustrated in FIG. 15 resulting in a large beat sound. This beat sound is caused by electromagnetic force caused by a magnetic flux generated when the transformer 108 is magnetized. Electromagnetic force affects the central magnetic legs to the largest extent. Electromagnetic force is generated in such a direction that mating central magnetic legs (facing each other) are stuck to each other, i.e., the direction illustrated by the arrow in FIG. 17A. When electromagnetic force is applied to the transformer 108, the transformer 108 deforms as illustrated in FIG. 17A.

Figure 18A:
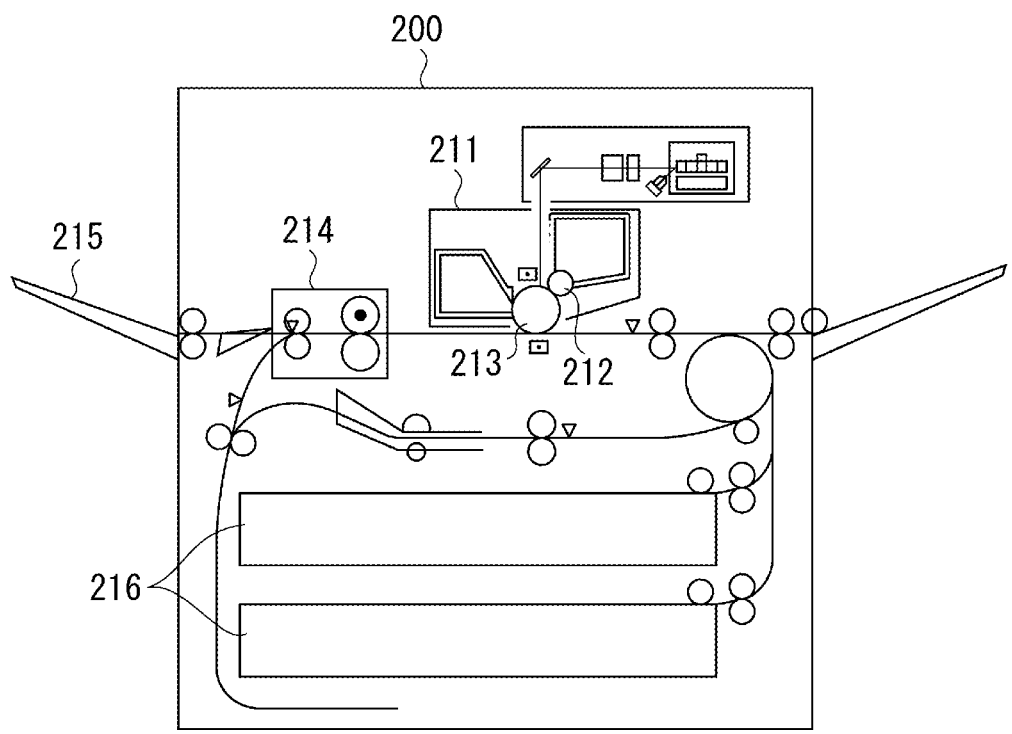
FIGS. 18A and 18B illustrate example applications of the switching power supply.
Figure 18B:
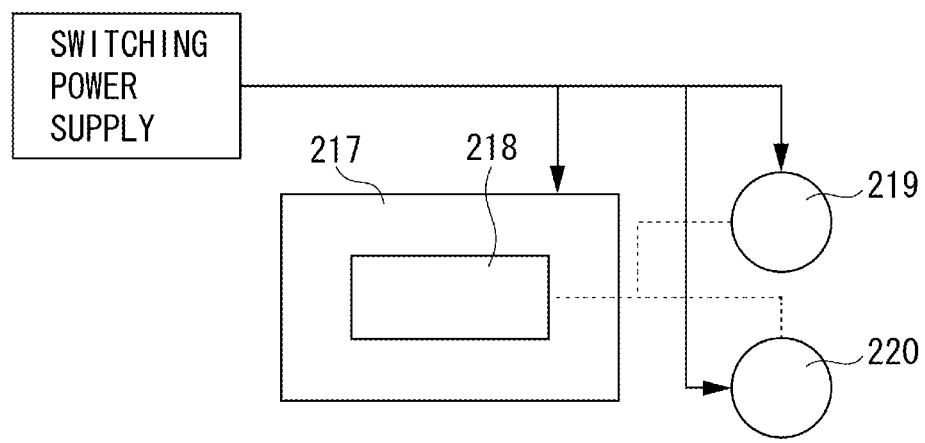

When the switching device turns OFF and the amount of magnetic flux decreases, restorative force by the elasticity of the cores 301 and 302 works and the transformer 108 deforms as illustrated in FIG. 18B. When the transformer 108 deforms in this way, mating outer magnetic legs vibrate and a beat sound is generated by the friction therebetween.

Figure 16:
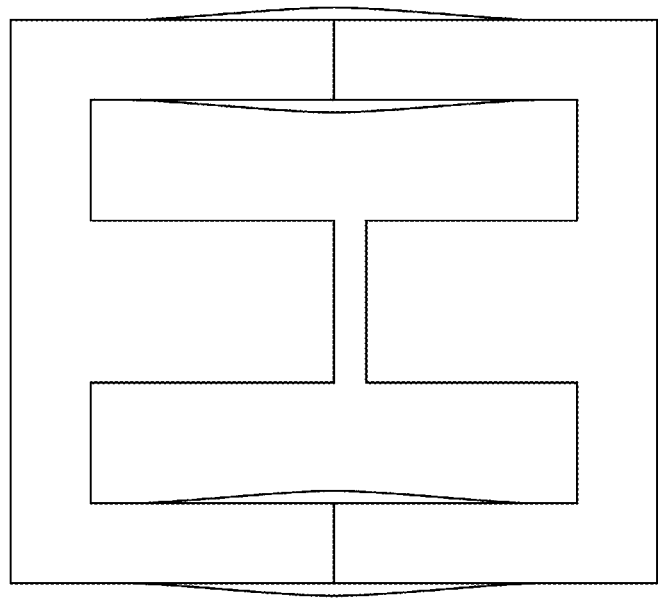
FIG. 16 illustrates an inherent vibration of the transformer.

The beat sound can be reduced by closely sticking mating outer magnetic legs (facing each other) as illustrated in FIG. 16. However, even if mating outer magnetic legs are closely stuck to each other, they vibrate as one elastic body and therefore vibration sound by the natural vibration of the outer magnetic legs remains. In other words, even if mating outer magnetic legs are closely stuck to each other, it is difficult to sufficiently attenuate the beat sound.

Figure 17B:
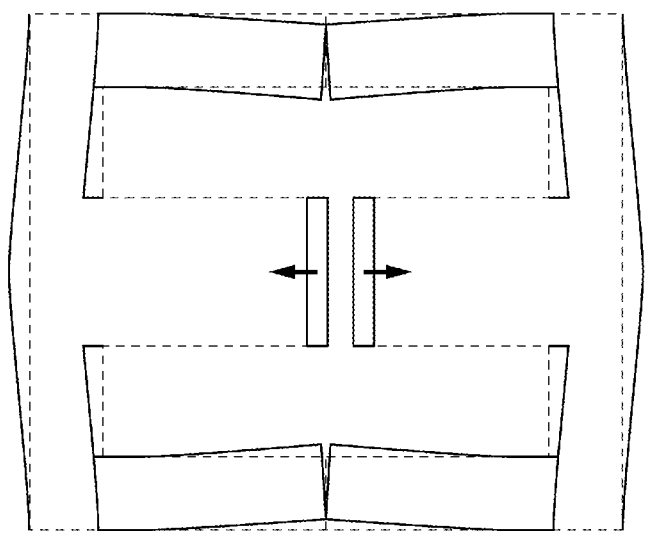

These days, there has been a demand for further power saving when equipment is not operating, and increasing number of switching operations power supplies have reduced the number of switching operations to reduce power consumption in the light load state such as non-operating state, thus improving the operation efficiency. As a result, the drive frequency of the transformer 108 of such a switching power supply falls within the audio frequency region, possibly increasing the beat sound of the transformer 108. There is a tendency of increasing the amount of current to be sent to the switching element while it is ON to reduce switching loss. In this case, electromagnetic force to the cores 301 and 302 of the transformer 108 increases, possibly increasing a beat sound by vibration as illustrated in FIG. 17. A mechanism of beat sound generation from the transformer 108 has been described above.

The circuit configuration and operation of the switching power supply (basis of the present invention) will be described below with reference to FIGS. 7A and 7B. The switching power supply to be described below is also generally referred to as flyback-type switching power supply.

Figure 7A:
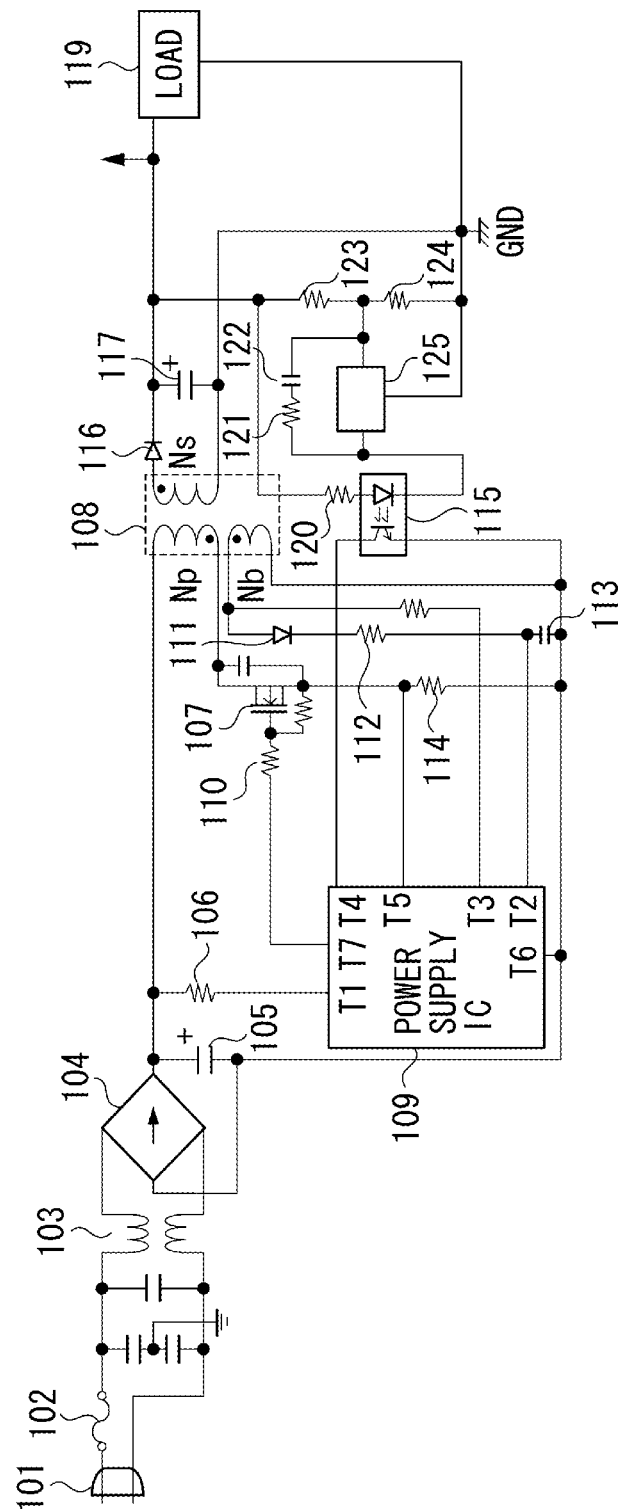
FIG. 7A is a pre-required circuit diagram illustrating the switching power supply.

Referring to FIG. 7A, the circuit diagram includes an inlet 101 for supplying the power voltage from the commercial alternating current (AC) power supply, a fuse 102, a common mode coil 103, a rectifying diode bridge 104, a primary smoothing capacitor 105, a starting resistor 106 for activating a power supply IC 109, and a switching element 107 for intermittently blocking the current flowing through a primary winding Np of the transformer 108. In this example, a metal oxide semiconductor (MOS)-FET 107 (hereinafter referred to as FET 107) is applied. The flyback-type transformer 108 having the primary winding Np (primary side) and the secondary winding Ns (secondary side) transforms (converts) an input DC voltage to a required output voltage. The power supply IC 109 controls the ON/OFF operation of the FET 107.

The circuit diagram further includes a resistor 110 for limiting the current flowing through the gate of the switching FET 107, and a diode 111 for rectifying the voltage induced in an auxiliary winding Nb of the transformer 108. The circuit diagram further includes a resistor 112 and a capacitor 113 which form a filter circuit. The circuit diagram further includes a current detecting resistor 114 (first resistor of a current detecting circuit for detecting the current flowing through the transformer 108), a photo coupler 115 for transmitting the output of a shunt regulator 125 to the power supply IC 109, a diode 116 for rectifying the voltage of the secondary winding Ns of the transformer 108, and a smoothing capacitor 117.

The circuit diagram further includes a load 119 connected to the switching power supply, a resistor 120 for limiting the current to be sent to the photo coupler 115, a resistor 121, and a capacitor 122. The resistor 121 and the capacitor 122 form a phase compensation circuit. The circuit diagram further includes regulation resistors 123 and 124 and the shunt regulator 125.

First, as normal operation (regular load state) of the switching power supply, the AC voltage of the commercial AC power input from the inlet 101 is full-wave rectified by the rectifying diode bridge 104, and then charged in the primary smoothing capacitor 105 as a DC voltage. This DC voltage activates the power supply IC 109 via the starting resistor 106.

When the power supply IC 109 starts operation and the FET 107 enters a conductive (ON) state, the DC voltage of the primary smoothing capacitor 105 is applied to the primary winding Np, and a voltage having a positive polarity on the same polarity side as the primary winding Np is induced in the auxiliary winding Nb. Although a voltage is induced also in the secondary winding Ns in this case, the voltage is not transmitted to the secondary side since the voltage has a negative polarity on the anode side of the diode 116. Therefore, only the exciting current of the transformer 108 flows through the primary winding Np. Energy proportional to the square of the exciting current is accumulated in the transformer 108. This exciting current increases in proportion to time.

The voltage induced in the auxiliary winding Nb charges the capacitor 113 via the diode 111 and the resistor 112, providing a power voltage for the power supply IC 109.

When the FET 107 enters a non-conductive (OFF) state, a voltage having an inverse polarity of the voltage at the time of activation is induced in each winding of the transformer 108, and a voltage having a positive polarity on the anode side of the diode 116 is induced in the secondary winding Ns. The energy accumulated in the transformer 108 is rectified and smoothed by the diode 116 and the smoothing capacitor 117, respectively, and then supplied to the load 119 as a DC output voltage 118. When the transformer 108 operates in this way, the voltage generated by the auxiliary winding Nb of the transformer 108 is supplied as a power voltage for the power supply IC 109. This enables the power supply IC 109 to continue operation, so that switching (ON/OFF) operation of the FET 107 can be successively carried out, thus stable voltage can be continuously output from the transformer 108.

The voltage value of the DC output voltage 118 is controlled as follows. First, a voltage generated by dividing the DC output voltage 118 by the regulation resistors 123 and 124 is input to the shunt regulator 125. Then, a feedback signal is generated based on this input voltage and then transmitted (fed back) to the power supply IC 109 via the photo coupler 115. By controlling the ON/OFF operation of the FET 107 based on this feedback signal, the power supply IC 109 can output a stable DC voltage. In the power supply IC 109 illustrated in FIG. 7A, reference numerals T1 to T7 are assigned to terminals to indicate a correspondence to each terminal in the detailed circuit diagram of the power supply IC 109 described below.

The operation of the FET 107 (switching element) of the switching power supply and the power supply IC 109 for controlling its ON/OFF operation will be described in detail below. In the following descriptions on the power supply IC 109, three different operation modes (frequency unfixed mode, duty unfixed mode, and current control mode) will be described below. These operation modes apply to general power supply ICs.

Figure 7B:
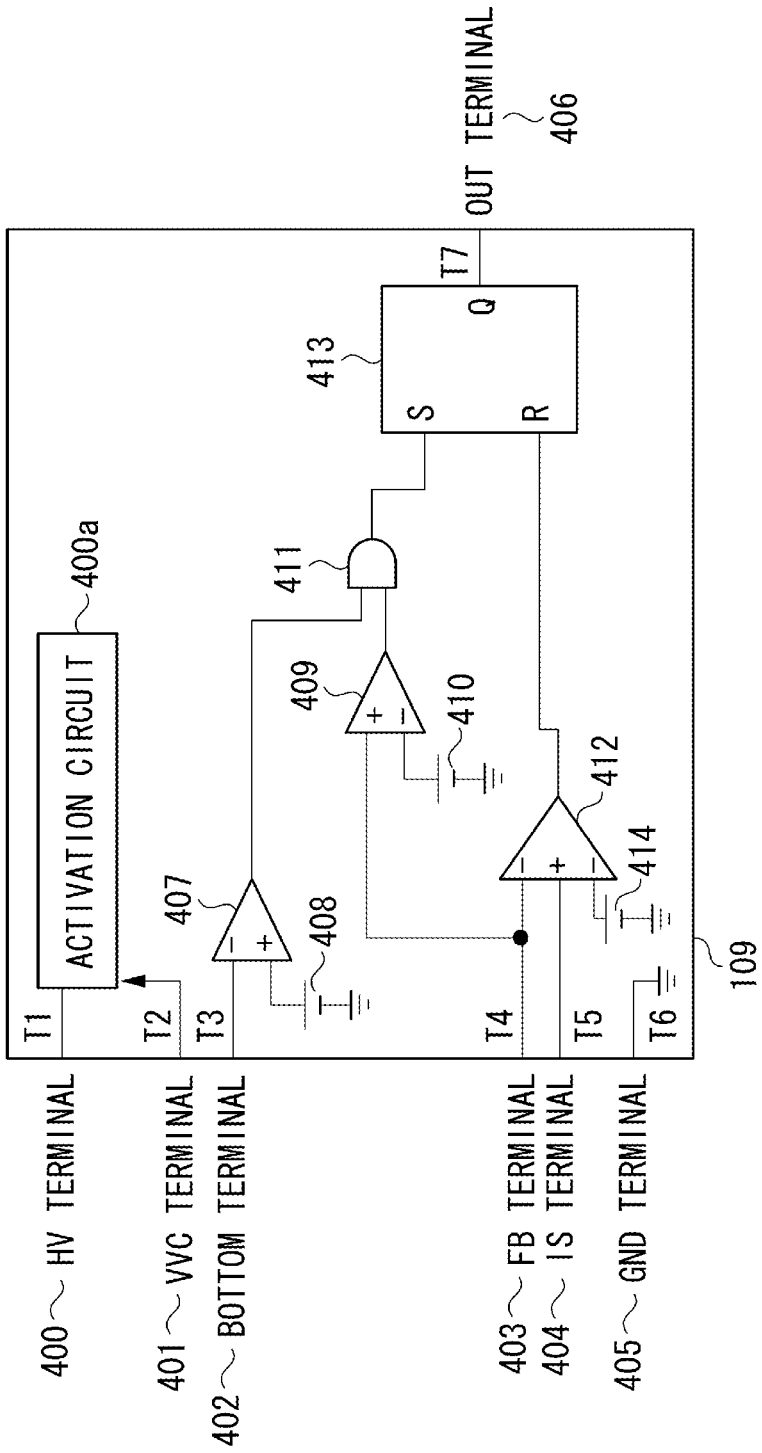
FIG. 7B is a schematic block diagram illustrating a power supply IC according to the present invention.

FIG. 7B is a schematic block diagram illustrating the power supply IC 109. The schematic diagram illustrated in FIG. 7B includes an activation circuit 400a for activating the power supply IC 109 and a VCC terminal 401 for inputting the power voltage to be supplied to the power supply IC 109. The schematic diagram illustrated in FIG. 7B further includes a BOTTOM terminal 402, a feedback (FB) terminal 403, an IS terminal 404, a ground (GND) terminal 405 of the power supply IC 109, an OUT terminal 406, comparators 407, 409 and 412, reference voltages 408 and 410, an AND circuit 411, and an RS flip-flop logical circuit 413.

Functions of main portions of the power supply IC 109 illustrated in the block diagram in FIG. 7B will be described below.

VH Terminal 400 (T1) and Activation Circuit 400a
A terminal for inputting the voltage for activation connected to the starting resistor 106, and a circuit for activating the power supply IC 109

VCC Terminal 401 (T2)
A terminal for inputting the voltage generated in the auxiliary winding Nb as a power voltage for the power supply IC 109

BOTTOM Terminal 402 (T3)
A terminal for monitoring a voltage Vds between the drain and source of the FET 107

FB Terminal 403 (T4)
A feedback terminal, i.e., a terminal for inputting variation in DC output voltage 118 via the photo coupler 115

IS Terminal 404 (T5)
A terminal for monitoring a drain current Id flowing through the FET 107.

GND Terminal 405 (T6)
A GND terminal of the power supply IC 109

OUT Terminal 406 (T7)
A terminal connected to the gate terminal of the FET 107

Comparator 407
Outputs a HIGH signal to the AND circuit 411 when the voltage of the BOTTOM terminal 402 falls below the reference voltage 408.

Comparator 409
Outputs a HIGH signal to the AND circuit 411 when the voltage of the FB terminal 403 exceeds the reference voltage 408.

AND circuit 411
Receives the outputs of the comparator 407 and the comparator 409.

Comparator 412
Compares the voltage of the FB terminal 403 with the voltage input from the IS terminal 404 and outputs a HIGH signal to the RS flip-flop logical circuit 409 when the voltage input from the IS terminal 404 is higher than the voltage of the FB terminal 403. Further, stops the oscillation of the power supply IC 109 when the voltage input from the IS terminal 404 exceeds the reference voltage 414.

RS Flip-Flop Logical Circuit
A known RS flip-flop logical circuit (detailed descriptions will be omitted).

FIG. 8 illustrates operation waveforms of the switching power supply controlled by the above-described power supply IC 109. Operations of the power supply IC 109, the FET 107, the transformer 108, and the diode 116 of the switching power supply will be described below with reference to FIGS. 7A, 7B, 8, and 9.

(Timing 1 in FIG. 8)
Timing 1 illustrated in FIG. 8 is timing when the FET 107 has just entered the conductive (ON) state. At this timing, the drain current Id of the FET 107 linearly increases. Energy is accumulated in the transformer 108 by the drain current Id of the FET 107. Since the diode 116 is reverse-biased, a current If does not flow through the diode 116. Therefore, the DC output voltage 118 decreases. Further, the voltage of the FB terminal 403 gradually increases via the photo coupler 115. Similar to the drain current Id of the switching FET 107, the voltage of the IS terminal 404 linearly increases.
(Timing 2 in FIG. 8)

Timing 2 illustrated in FIG. 8 is timing when the voltage of the IS terminal 404 exceeds the voltage of the FB terminal 403. At the timing 2, the R terminal of the RS flip-flop logical circuit 409 enters the HIGH state (hereinafter referred to as HI), the Q terminal 406 of the RS flip-flop logical circuit 409 (i.e., the OUT terminal of the power supply IC 109) enters the LOW state, and the FET 107 enters the non-conductive (OFF) state. Therefore, the drain current Id of the FET 107 does not flow. The diode 116 is forward-biased and enters the conductive state. Accordingly, the energy accumulated in the transformer 108 begins to flow as the current If of the diode 116 and accordingly the DC output voltage 118 increases. Therefore, the voltage of the FB terminal 403 gradually decreases via the photo coupler 115. The voltage of the IS terminal 404 also stops at timing similar to the timing when the drain current Id of the FET 107 stops.
(Timing 3 in FIG. 8)

Timing 3 illustrated in FIG. 8 is timing when the voltage of the BOTTOM terminal 402 becomes equal to or lower than the reference voltage 408 and the voltage of the FB terminal 403 exceeds the reference voltage 410. In this case, a HIGH signal is input from the AND circuit 411 to the S terminal of the RS flip-flop logical circuit 409, the Q terminal 406 of the RS flip-flop logical circuit 409 (i.e., the OUT terminal of the power supply IC 109) becomes HI, and the FET 107 enters the conductive (ON) state. The timing 3 equals the timing 1. Subsequently, the above-described series of operations are repeated from the timing 1.

As described above, the switching power supply performs a series of switching operations in which the power supply IC 109 operates in the frequency unfixed, duty unfixed, and current control modes.

Figure 9:
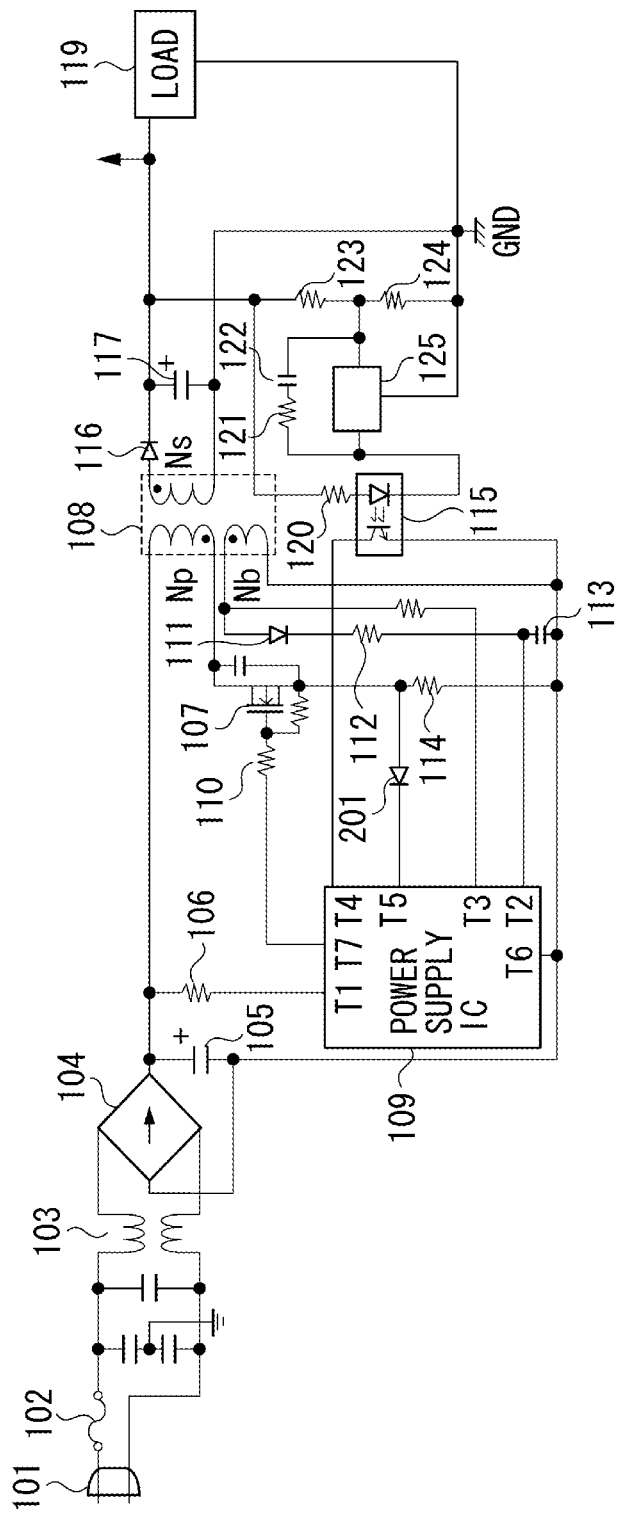
FIG. 9 is a circuit diagram illustrating a switching power supply capable of power saving.
Figure 10A:
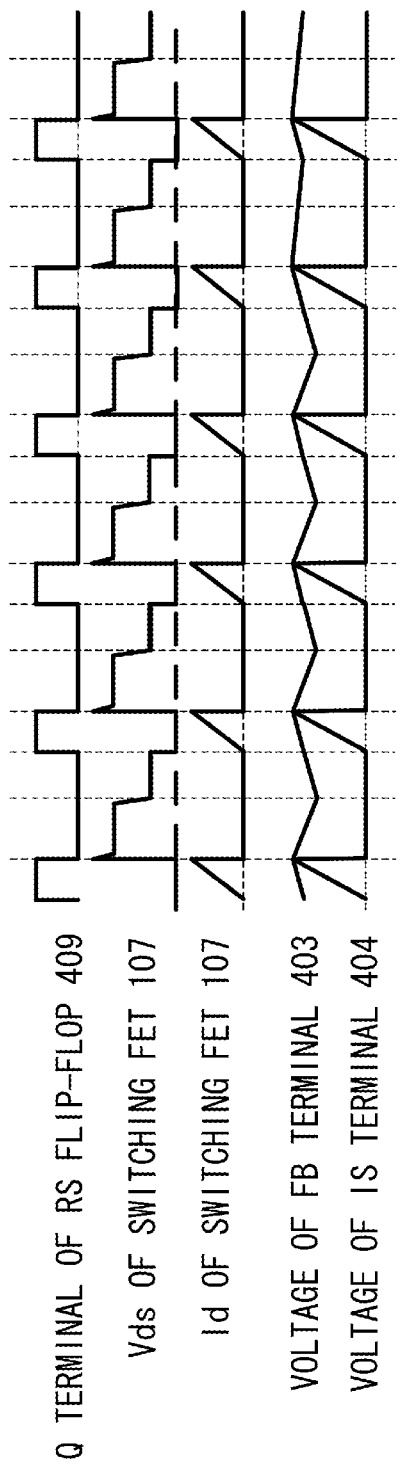

The configuration and operation of the switching power supply that has reduced the number of switching operations to reduce switching loss due to the switching operation of the FET 107 will be described below with reference to FIGS. 9, 10A, and 10B. The configuration of the power supply IC 109 illustrated in FIG. 9 is similar to that illustrated in FIG. 7A, and its descriptions will be omitted. FIG. 10B illustrates operation waveforms of the circuit illustrated in FIG. 9 in the light load state. As a comparative example, FIG. 10A illustrates operation waveforms of the circuit illustrated in FIG. 7A. The circuit illustrated in FIG. 9 differs from the circuit illustrated in FIG. 7A only in that a diode 201 is connected to the input line to the IS terminal 404 (T5). The circuit illustrated in FIG. 9 controls by using the diode 201 the timing of voltage input to the IS terminal 404 to perform the operation illustrated in FIG. 10B described below.
(Period A in FIG. 10B)

Referring to a period A in FIG. 10B, in the light load state, at a point B0 where the voltage generated at the current detecting resistor 114 exceeds a threshold voltage Vf of the diode 201, the voltage of the IS terminal 404 starts rising at a fixed inclination. At timing when the voltage of the IS terminal 404 reaches the same voltage as the voltage of the FB terminal 403, the FET 107 enters the non-conductive (OFF) state.

By using the fact that the voltage generated at the current detecting resistor 114 falls by the threshold voltage Vf of the diode 201, the time period during which the FET 107 changes from the conductive (ON) state to the non-conductive (OFF) state is prolonged so as to become longer than the timing illustrated in FIG. 10A (operation waveforms of the switching power supply illustrated in FIG. 7A). The ratio of the time period during which the FET 107 enters the non-conductive (OFF) state in FIG. 10B, to the relevant time period in FIG. 10A, is determined by the threshold voltage Vf of the diode 201. For example, with the configuration illustrated in FIG. 9, when reducing the number of switching operations of the FET 107 to one sixth of switching operations in FIG. 7A, the threshold voltage Vf of the diode 201 can be calculated by the following formulas (1) and (2).

In the Case of FIG. 7a $$P1 = \tfrac{1}{2} \times L \times I1^2 \qquad (1)$$

P1: Energy accumulated in transformer 108
L: L value of transformer 108
I1: Peak value of drain current Id of switching FET 107

In the Case of FIG. 9

$$P2 = \tfrac{1}{2} \times L \times I2^2 \qquad (2)$$

P2: Energy accumulated in transformer 108
L: L value of transformer 108
I2: Peak value of drain current Id of switching FET 107

To reduce the number of switching operations to one sixth, I2 is $\sqrt{6} \times I1$ since $6 \times P1 = P2$. Specifically, the conduction time of the switching FET 107 in the case of FIG. 9 becomes $\sqrt{6}$ times as much as the conduction time in the case of FIG. 7A. A relation between the threshold voltage Vf and a peak voltage VIS of the IS terminal 404 is given by $1 + Vf/VIS = \sqrt{6}$, i.e., $Vf = (\sqrt{6} - 1) \times VIS$.

FIG. 11 illustrates a difference in overload detection timing between the cases in FIGS. 7 and 10B. As illustrated in FIG. 11, the difference in overload detection timing is caused by the diode 201. The larger the difference, the more mis-detection of the overload state is likely to occur.
(Period B in FIG. 10B)

After the FET 107 enters the non-conductive (OFF) state, in a period B illustrated in FIG. 10B, the energy accumulated in the transformer 108 is sent to the secondary side of the transformer 108 as a flyback current. Even after the flyback current has been sent, the output from the AND circuit 411 cannot be set to HI unless the voltage of the FB terminal 403 exceeds the reference voltage 410. Therefore, the S terminal of the flip-flop logical circuit 409 cannot be set to HI. Thus, the FET 107 cannot enter the conductive (ON) state. Thus, the power supply IC 109 controls the switching operation of the FET 107 so that it remains in the non-conductive (OFF) state even after the flyback current has been sent, thus stabilizing the DC output voltage 118.
(Period C in FIG. 10B)

In a period C illustrated in FIG. 10B, the FET 107 enters the conductive (ON) state again. To enable the FET 107 to enter the conductive (ON) state, it is necessary that the voltage of the FB terminal 403 exceeds the reference voltage 410 and that the voltage of the BOTTOM terminal 402 falls below the reference voltage 408. Then, after the flyback current has been sent, the DC output voltage 118 decreases and accordingly the voltage of the FB terminal 403 gradually increases. When the voltage of the FB terminal 403 exceeds the reference voltage 410, the FET 107 enters the conductive (ON) state.

As described above, the timing when the FET 107 enters the conductive state is the timing when the voltage of the BOTTOM terminal 402 becomes equal to or lower than the reference voltage 408 and the voltage of the FB terminal 403 exceeds the reference voltage 410. In the regular load state, since the voltage of the terminal FB is higher enough than the reference voltage 410, the FET 107 enters the conductive state at the timing when the voltage of the BOTTOM terminal 402 becomes equal to or lower than the reference voltage 408.

In the light load state, on the other hand, the voltage of the terminal FB is low and, while the energy accumulated in the transformer 108 flows into the secondary transformer side as a flyback current, the voltage of terminal FB falls below the reference voltage 410. Therefore, after the flyback current have been sent, the switching FET 107 cannot be in the conductive state until the voltage of the terminal FB exceeds the reference voltage 410. Thus, in the light load state, intermittent oscillation results as illustrated in FIG. 10B.

As described above, reducing the number of switching operations by using the circuit illustrated in FIG. 9 enables further power saving in the light load state than the circuit illustrated with FIG. 7A does.

Figure 12:
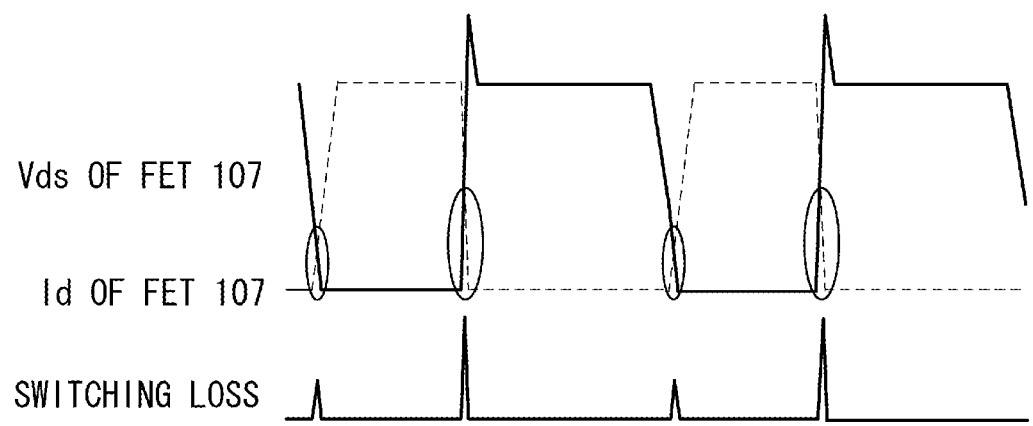
FIG. 12 illustrates switching loss.

FIG. 12 is a schematic diagram illustrating switching loss of the FET 107. As illustrated in FIG. 12, switching loss refers to a loss arising during switching (ON/OFF) operation of the FET 107. Switching loss is represented by the electric power obtained by multiplying a voltage Vds between the drain and source by the drain current Id of the FET 107 during switching operation. This switching loss in the case of FIG. 10B is lower than that in the case of FIG. 10A.

On the premise of the above-described configuration and operation of the switching power supply, characteristic configuration and operation according to the present invention will be described in detail below with reference to some exemplary embodiments.

Figure 1A:
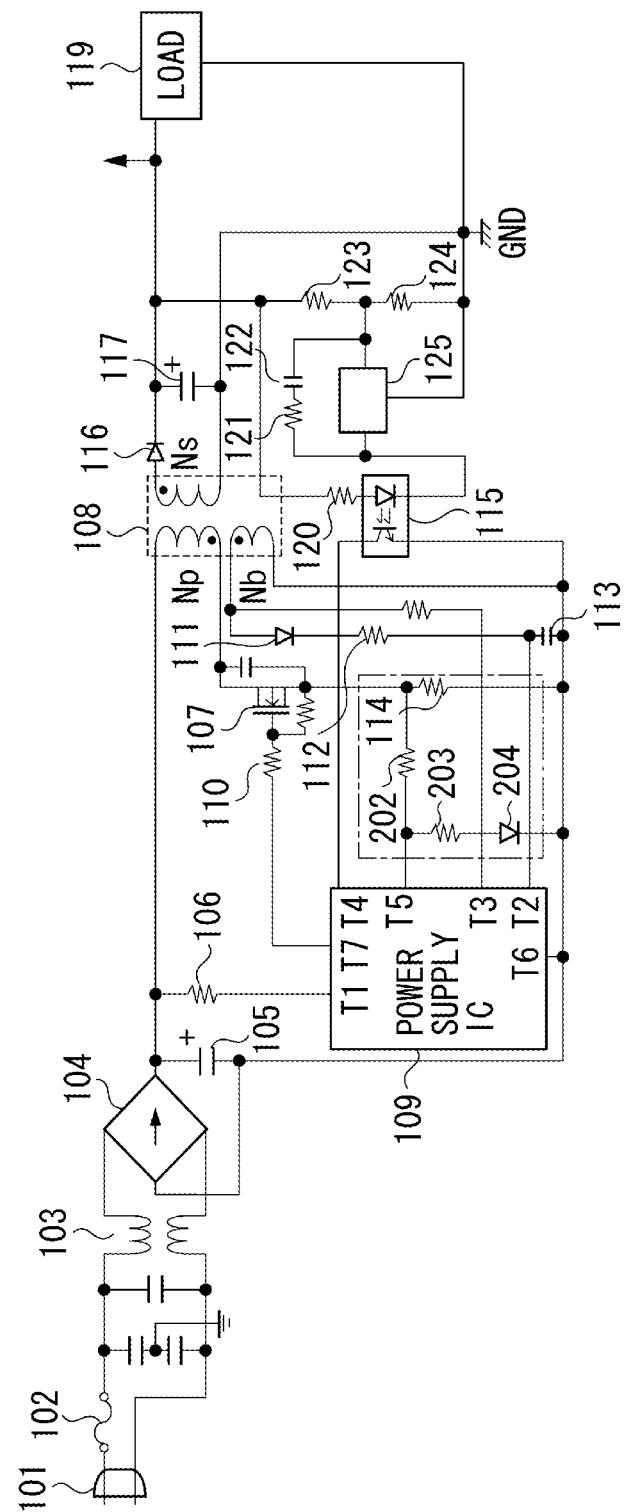
FIG. 1A is a circuit diagram illustrating a switching power supply.

FIG. 1A is a circuit diagram illustrating the switching power supply according to the first exemplary embodiment. The circuit illustrated in FIG. 1A has a similar basic configuration to the circuit illustrated in FIG. 7A. The circuit illustrated in FIG. 1A differs from the circuit illustrated in FIG. 7A in that a series circuit including a resistor 202 (second resistor), a resistor 203 (third resistor), and a diode 204 is connected in parallel with the current detecting resistor 114, and that the connection point of the resistors 202 and 203 is connected to the IS terminal 404 of the power supply IC 109.

Referring to FIG. 1A, the above-described circuit (enclosed by a dashed line) formed of the plurality of resistors and the diode characterizes the present exemplary embodiment. Specifically, the circuit is formed of the current detecting resistor 114 (first resistor), the resistor 202 (second resistor), the resistor 203 (third resistor), and the diode 204. Other components are similar to those of the circuit illustrated in FIG. 7A, and detailed descriptions will be omitted.

The circuit configuration according to the present exemplary embodiment (see FIG. 1A) can further reduce a beat sound of the transformer 108 in the light load state than the circuit configuration illustrated in FIG. 7A does. In addition to the beat sound reduction, the capability of preventing misdetection of overcurrent also characterizes the present exemplary embodiment. The circuit operation according to the present exemplary embodiment will be described in detail below in terms of (1) circuit operation in the light load state, (2) circuit operation in the regular load state, and (3) circuit operation in the overload state.

(Circuit Operation in the Light Load State)

Figure 2B:
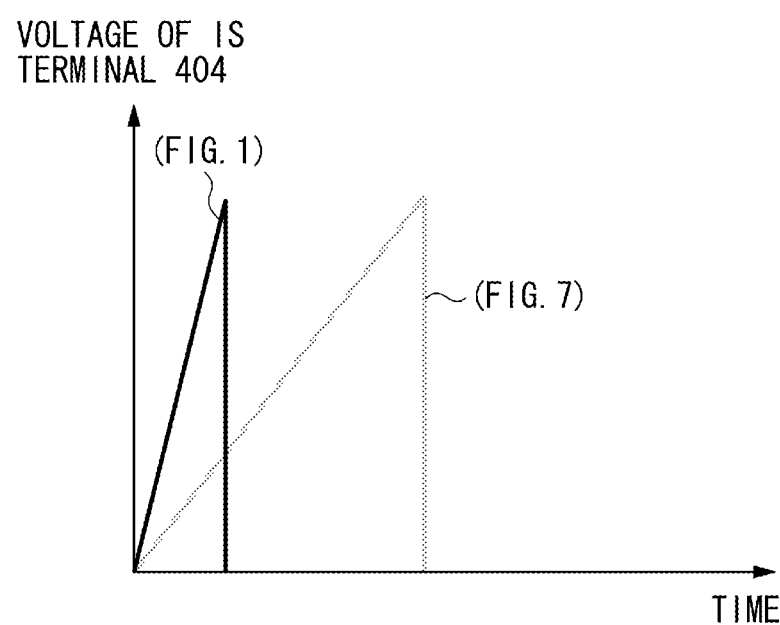
FIG. 2B illustrates a voltage waveform input to the input signal (IS) terminal of the power supply IC in the light load state according to the first exemplary embodiment of the present invention.

FIG. 2A illustrates operation waveforms (intermittent oscillation) of the circuit illustrated in FIG. 1A in the light load state. FIG. 2B illustrates a voltage waveform (voltage waveform in one switching) of the IS terminal 404 of the power supply IC 109. When the FET 107 enters the conductive (ON) state, the voltage of the IS terminal 404 starts rising with a constant inclination. At timing when the voltage of the IS terminal 404 reaches the same voltage as the voltage of the FB terminal 403, the FET 107 enters the non-conductive (OFF) state. In the light load state, since the voltage of the IS terminal 404 does not exceed the forward voltage Vf of the diode 204, a voltage detected by the current detecting resistor 114 is input to the IS terminal 404 as it is. In this case, to reduce a beat sound of the transformer 108, the current detecting resistor 114 illustrated in FIG. 1A has a higher resistance value than that illustrated in FIG. 7A.

Thus, as illustrated in FIG. 2B, in the light load state, the circuit illustrated in FIG. 1A provides a shorter switching interval (higher switching frequency) than the circuit illustrated in FIG. 7A. As a result, the current value flowing through the transformer 108 at a time decreases. Specifically, when the current value flowing through the transformer 108 in one switching operation of the FET 107 is reduced in the light load state compared with the circuit illustrated in FIG. 7A, electromagnetic force of the core of the transformer 108 can be weakened, thus further reducing a beat sound of the transformer 108.

The voltage VIS input to the IS terminal 404 in the light load state is represented by the following formula (3).

$$VIS = Vo = RIS \times Id \tag{3}$$

where Vo indicates the voltage detected by the current detecting resistor 114, RIS indicates the resistance value of the current detecting resistor 114, and Id indicates the drain current flowing through the FET 107.

(Circuit Operation in the Regular Load State)

Figure 3B:
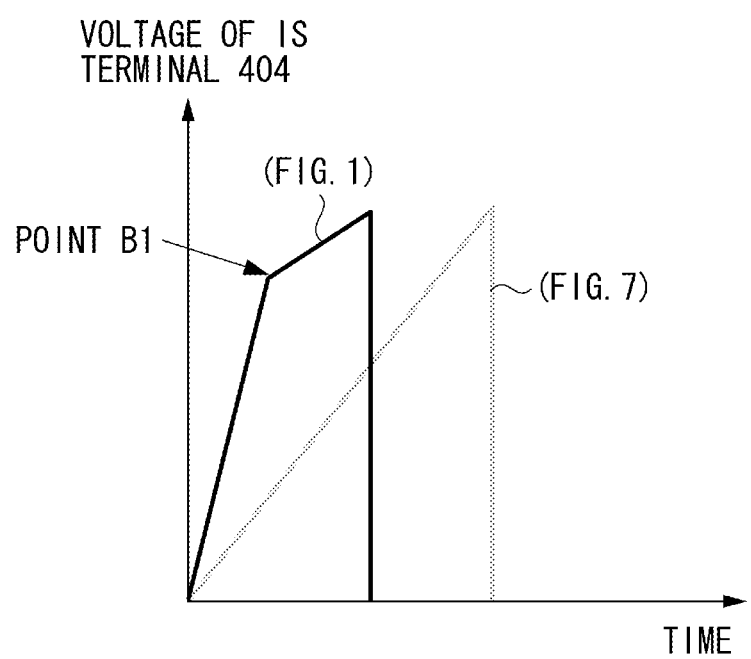
FIG. 3B illustrates a voltage waveform input to the IS terminal of the power supply IC in the regular load state according to the first exemplary embodiment of the present invention.

FIG. 3A illustrates operation waveforms of the circuit illustrated in FIG. 1A in the regular load state. FIG. 2B illustrates a voltage waveform (voltage waveform in one switching operation) of the IS terminal 404 of the power supply IC 109. In the regular load state, the inclination changes at timing (point B1) when the voltage of the IS terminal 404 exceeds the forward voltage Vf of the diode 204. From 0 V to the point B1, the voltage of the IS terminal 404 increases with the same inclination as in the light load state. When the voltage exceeds the point B1, the voltage increases with an inclination of the voltage division ratio determined by the voltage-dividing resistors 202 and 203 (i.e., the inclination becomes gradual as an increase rate changes).

The voltage VIS of the IS terminal 404 is represented by the following formulas (4), (5), and (6), where Vo indicates the voltage detected by the current detecting resistor 114, RIS indicates the resistance value of the current detecting resistor 114, Id indicates the drain current flowing through the FET 107, Ra and Rb indicate the resistance values of the voltage-dividing resistors 202 and 203, respectively, Vf indicates the forward voltage of the diode 204, and i indicates the current flowing through the series circuit formed of the voltage-dividing resistors 202 and 203 and the diode 204. According to the following formulas (4) to (6), the point B1 is timing when the voltage VIS of the IS terminal 404 becomes equal to the forward voltage Vf of the diode 204.

When RIS<<Ra and RIS<<Rb are set, the following formula (4) is given with Id>>i.

$$Vo \approx Ra \times Id \tag{4}$$

Since VIS=Vo−Ra×i and VIS=Vf+Rb×i, the following formula (5) results.

$$VIS = ((Ra \times Vf) + (Rb \times Vo))/(Ra + Rb) \tag{5}$$

A boundary condition for the point B1 is obtained below. Assuming that VIS=Vo in formula (4), $$VIS = ((Ra \times Vf) + (Rb \times Vo))/(Ra + Rb) \quad (6)$$
$$= ((Ra \times Vf) + (Rb \times VIS))/(Ra + Rb)$$
$$(Ra + Rb) \times VIS(Ra \times Vf) + (Rb \times VIS)$$

As a result, VIS=Vf. As the boundary condition, the timing when the voltage VIS of the S terminal 404 becomes equal to the forward voltage Vf of the diode 204 becomes the point B1.

(Circuit Operation in the Overload State)

FIG. 4 illustrates a voltage waveform (in one switching operation) of the IS terminal 404 in the overload state. The overload state means a load state where an excessive output current flows. In this case, the switching power supply needs to correctly detect the overload state and then stop the oscillation of the power supply IC 109.

When the peak voltage of the IS terminal 404 exceeds the reference voltage 414 of the comparator 412, the power supply IC 109 stops the oscillation. Also for overload detecting operation, a voltage detected by the current detecting resistor 114 minus the forward voltage Vf of the diode 204) is divided by the voltage-dividing resistors 202 and 203 and the divided voltage is input to the IS terminal 404. FIG. 4 illustrates an operation waveform in this case. The final overload detection value coincides with that in the circuit illustrated in FIG. 7.

Referring to FIG. 4, at a point B2, the peak voltage of the IS terminal 404 exceeds the forward voltage Vf of the diode 201. From the point B2, the voltage of the IS terminal 404 increases with an inclination determined by the division ratio of the resistance values between the voltage-dividing resistors 202 and 203 (the inclination becomes gradual as an increase rate changes).

Thus, in the overload state, when the diode 204 turns ON, a voltage detected by the current detecting resistor 114 minus the forward voltage Vf of the diode 204 is divided by the voltage-dividing resistors 202 and 203, and the divided voltage is input to the IS terminal 404. Thus, the inclination of the voltage input to the IS terminal 404 becomes gradual, and the overload state can be correctly detected with a required load (the same load as in the circuit in FIG. 7A) at the same timing as in the circuit in FIG. 7A. The inclination of this voltage is determined by the division ratio of the resistance values between the voltage-dividing resistors 202 and 203 and, therefore, can be set by adjusting the division ratio of the resistance values between the voltage-dividing resistors 202 and 203 in consideration of the forward voltage Vf of the diode 204.

When the diode 204 is not provided, the overload detection timing comes much later as illustrated by a dotted line, prolonging the overload state and possibly resulting in malfunction, for example, due to destruction of an element.

Figure 1B:
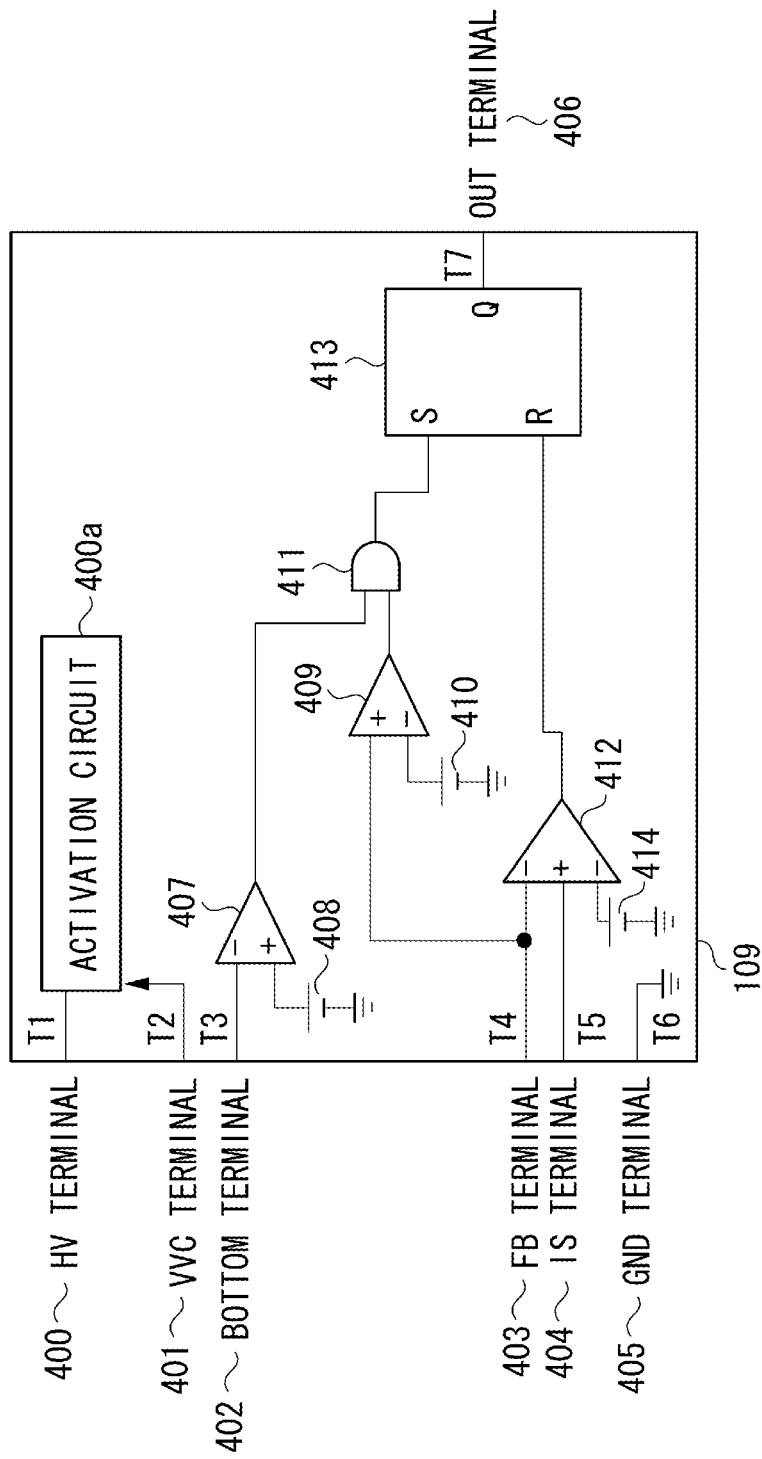
FIG. 1B is a schematic block diagram illustrating a power supply IC according to a first exemplary embodiment of the present invention.

The above-described overload detection configuration is effective particularly in a case where a power supply IC has a common terminal which serves as a terminal for stopping the switching element in the regular operating state and a terminal for detecting the overload state. This is because if the circuit illustrated in FIG. 1 is applied to such a power supply IC, a load at the time of overload state detection becomes higher in the regular operating state. This means that protection timing from the overcurrent (overload) may come later than in a case of the circuit configuration in FIG. 7A. This raises the ratings (dielectric strength) of the switching element (MOS-FET) and other elements, resulting in an increase in element size and cost. The configuration according to the present exemplary embodiment (see FIG. 1A) can cope with the above-described problems without raising the ratings of elements.

The following describes a method for setting the resistance values Ra and Rb of the voltage-dividing resistors 202 and 203, respectively, in the case of the forward voltage Vf of the diode 204, by using the following formulas (7) to (9), where VIS indicates the voltage of the IS terminal 404, Vo indicates the voltage detected by the current detecting resistor 114, RIS indicates the resistance value of the current detecting resistor 114, and Id indicates the drain current flowing through the FET 107.

$$VIS=((Ra \times Vf)+(Rb \times Vo))/(Ra+Rb) \quad (7)$$

$$Vo \approx Ra \times Id \quad (8)$$

The following formula (9) is given from the formulas (7) and (8).

$$VIS=((Ra \times Vf)+(Rb \times Ra \times Id))/(Ra+Rb) \quad (9)$$

When the drain current value Id for overload detection, the forward voltage Vf of the diode 204, and the voltage VIS of the IS terminal 404 for stopping the oscillation of the power supply IC are assigned to formula (9), the resistance values Ra and Rb of the voltage-dividing resistors 202 and 203 necessary for overload detection can be calculated.

As described above, the switching power supply according to the present exemplary embodiment enables reducing a beat sound generated from the transformer 108 in the light load state, and in addition preventing mis-detection of overload (overcurrent).

Figure 5A:
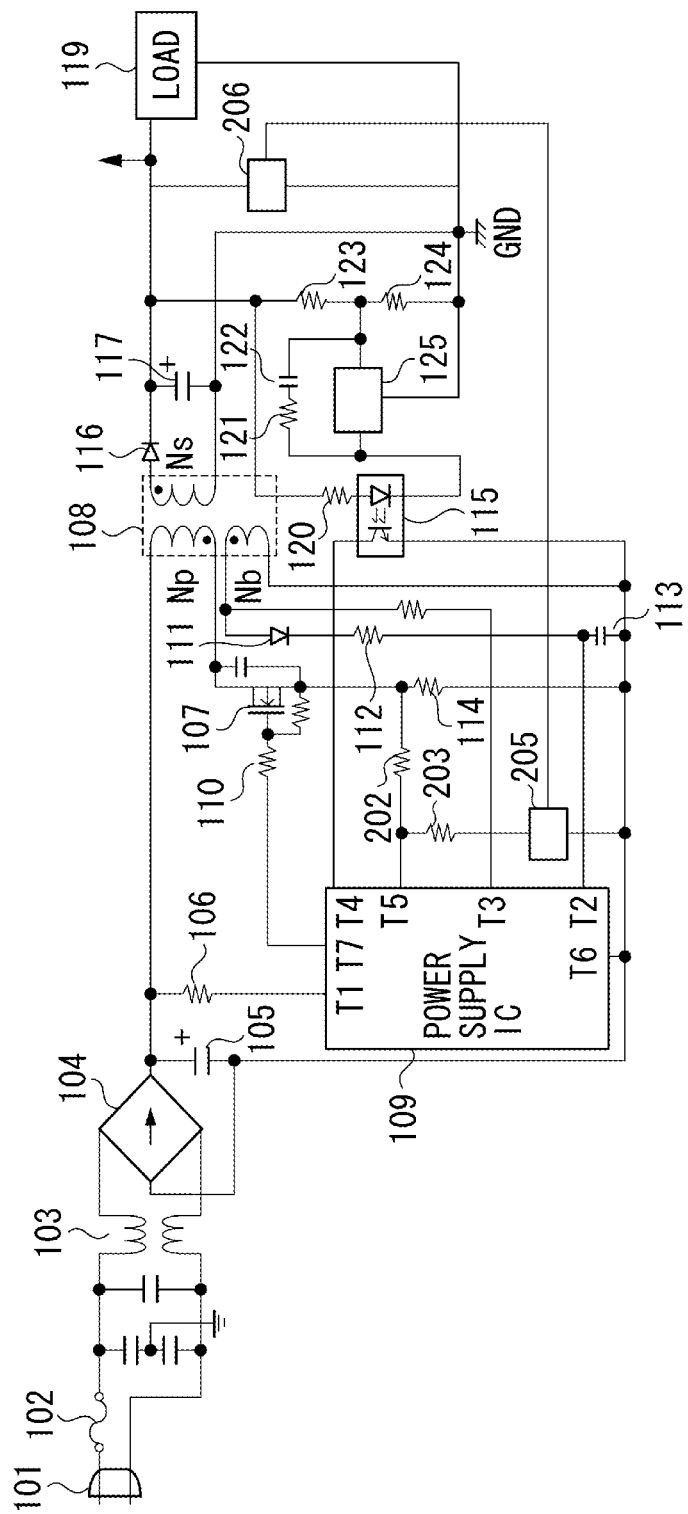
FIGS. 5A and 5B are circuit diagrams illustrating a switching power supply according to a second exemplary embodiment of the present invention.
Figure 5B:
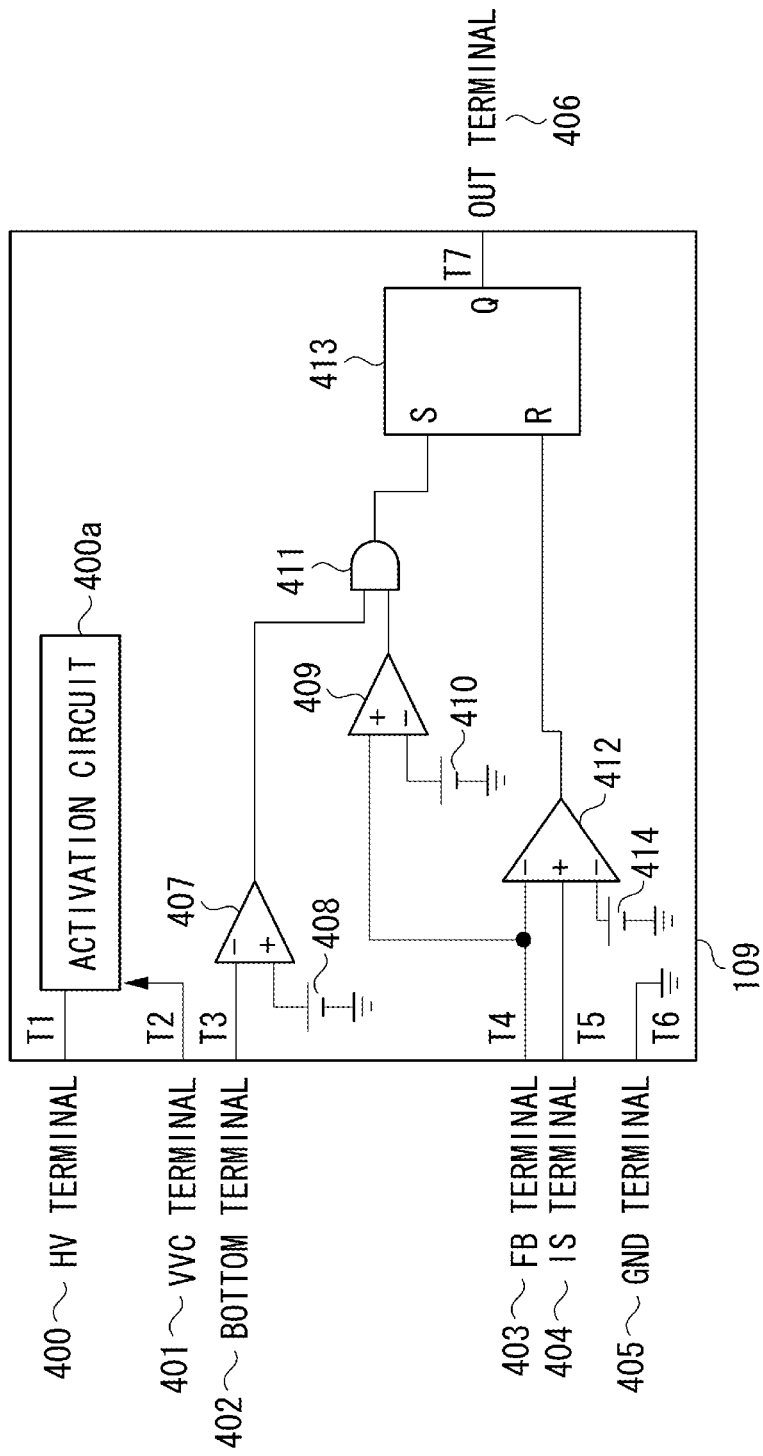

FIG. 5A is a circuit diagram illustrating a switching power supply according to a second exemplary embodiment. The circuit illustrated in FIG. 5A has a similar basic configuration to the circuit illustrated in FIG. 7A. The circuit illustrated in FIG. 5A differs from the circuit illustrated in FIG. 7A in that a series circuit including a resistor 202 (second resistor), a resistor 203 (third resistor), and a switching element 205 is connected in parallel with the current detecting resistor 114, and that the connection point of the resistors 202 and 203 is connected to the IS terminal 404 of the power supply IC 109. Referring to FIG. 5A, the above-described circuit (enclosed by a dashed line) formed of the plurality of resistors and the switching element characterizes the present exemplary embodiment. Specifically, the circuit is formed of the current detecting resistor 114 (first resistor), the resistor 202 (second resistor), the resistor 203 (third resistor), and the switching element 205.

Similar to the first exemplary embodiment, the circuit according to the present exemplary embodiment (see FIG. 5A) can reduce a beat sound of the transformer 108 in the light load state more than the circuit illustrated in FIG. 7. In addition to the beat sound reduction, the capability of preventing mis-detection of overload (overcurrent) also characterizes the present exemplary embodiment. Further, the operation of the switching power supply according the present exemplary embodiment is similar to that according to the first exemplary embodiment (see FIG. 1A).

With the circuit according to the present exemplary embodiment (see FIG. 5A), when the switching element 205 is turned OFF in the light load state, the voltage detected by the current detecting resistor 114 is input to the IS terminal 404 as it is and accordingly the current flowing through the FET 107 decreases. This weakens electromagnetic force of the core of the transformer 108 and accordingly reduces a beat sound of the transformer 108.

The voltage input to the IS terminal 404 is represented by the following formula (10), where Vo indicates the voltage detected by the current detecting resistor 114, RIS indicates the resistance value of the current detecting resistor 114, and Id indicates the drain current flowing through the FET 107.

$$VIS=Vo=RIS \times Id \tag{10}$$

In the overload state, when the switching element 205 is turned ON, a voltage detected by the current detecting resistor 114 minus a voltage drop by the switching element 205 is divided by the voltage-dividing resistors 202 and 203, and the divided voltage is input to the IS terminal 404. Thus, the inclination of the voltage of the IS terminal 404 becomes gradual, and the overload state can be correctly detected with a required load (the same load as in the circuit in FIG. 7A) at the same timing as in the circuit in FIG. 7A. The inclination of the voltage VIS is determined by the ratio of the resistance values between the voltage-dividing resistors 202 and 203. When the division ratio of the resistance values between the voltage-dividing resistors 202 and 203 is adjusted in consideration of the voltage drop by the switching element 205, similar overload detection to the circuit in FIG. 7A can be performed.

The voltage VIS of the IS terminal 404 is represented by the following formula (12), where Vo indicates the voltage detected by the current detecting resistor 114, RIS indicates the resistance value of the current detecting resistor 114, Id indicates the drain current flowing through the FET 107, Ra and Rb indicate the resistance values of the voltage-dividing resistors 202 and 203, respectively, and i indicates the current flowing through the voltage-dividing resistors 202 and 203.

When RIS<<Ra and RIS<<Rb are set, the following formula (11) is given with Id>>i.

$$Vo \approx Ra \times Id \tag{11}$$

Since VIS=Vo−Ra×i and VIS=Rb×i, the following formula (12) results.

$$VIS=(Rb \times Vo)/(Ra+Rb) \tag{12}$$

Figure 6:
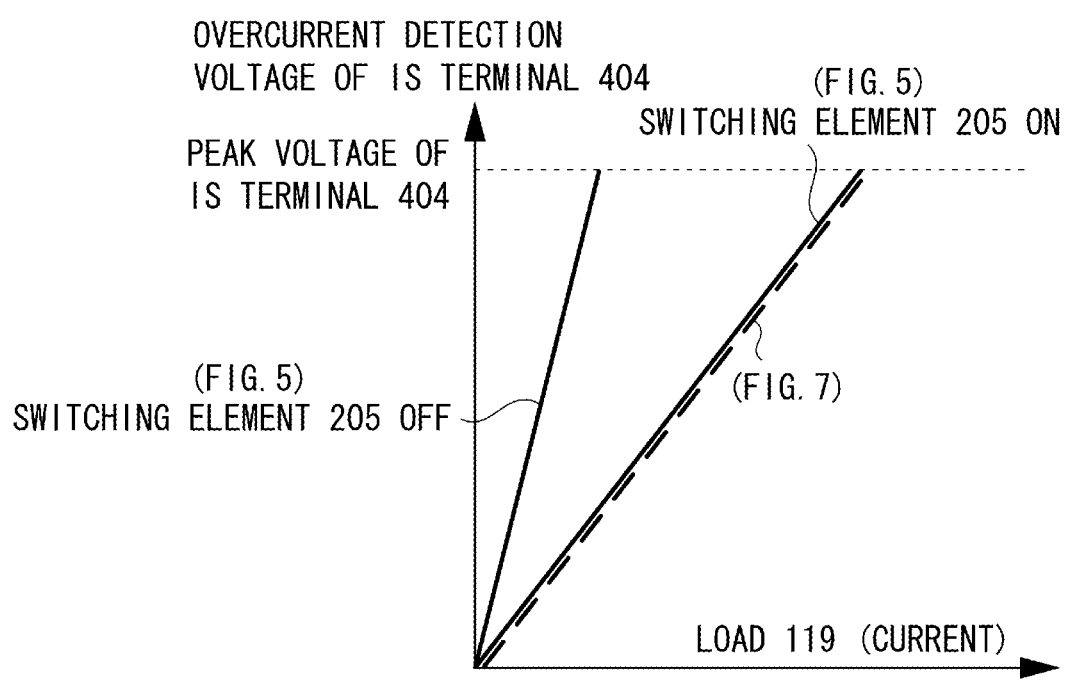
FIG. 6 illustrates a voltage waveform input to the IS terminal of the power supply IC according to the second exemplary embodiment of the present invention.

A difference of the present exemplary embodiment from the first exemplary embodiment will be described below. In the present exemplary embodiment, the increase rate of the voltage input to the IS terminal 404 is changed by the ON/OFF operation of the switching element 205. FIG. 6 illustrates a difference in detected voltage of the IS terminal 404 between the ON and OFF states of the switching element 205. In the present exemplary embodiment, the switching element 205 is provided on the downstream side of the resistor 203, and a control unit 206 for controlling the ON/OFF operation of the switching element 205 is provided on the secondary side of the transformer 108. Thus, the control unit 206 controls the ON/OFF operation of the switching element 205 to enable or disenable the voltage-dividing resistors 202 and 203.

In the light load state in which an apparatus is not operating, turning OFF of the switching element 205 through the control unit 206 enables the switching power supply to operate in a mode of reducing a beat sound of the transformer 108. In the operating state of the apparatus requiring a load, such as the regular operating state, the switching element 205 through the control unit 206 is turned ON to enable the voltage-dividing resistors 202 and 203 to detect the overload state with a similar load to that in FIG. 7. The switching element 205 may be, for example, a relay switch or a MOS-FET. The control unit 206 may be, for example, a central processing unit (CPU) or an application specific IC (ASIC) which controls the apparatus mounted with the switching power supply.

The following describes a method for setting the resistance values Ra and Rb of the voltage-dividing resistors 202 and 203, respectively, in the case of the forward voltage Vf of the diode 204, with reference to the following formulas (12) to (14), where VIS indicates the voltage of the IS terminal 404, Vo indicates the voltage detected by the current detecting resistor 114, RIS indicates the resistance value of the current detecting resistor 114, and Id indicates the drain current flowing through the FET 107.

$$VIS=(Rb \times Vo)/(Ra+Rb) \tag{12}$$

$$Vo \approx Ra \times Id \tag{13}$$

The formulas (12) and (13) give the following formula (14).

$$VIS=(Rb \times Ra \times Id)/(Ra+Rb) \tag{14}$$

Necessary resistance values Ra and Rb of the voltage-dividing resistors 202 and 203 for overload detection can be calculated by assigning to the formula (14) the drain current value Id for overload detection and the voltage VIS of the IS terminal 404 for stopping the oscillation of the power supply IC.

As described above, the switching power supply according to the present exemplary embodiment is capable of reducing a beat sound generated by the transformer in the light load state, and in addition preventing mis-detection of overvoltage (overcurrent).

As a method different from the above-described first and second exemplary embodiments, a current detecting circuit formed of, for example, a current transformer in the line of the current detecting resistor 114 may be provided. In this case, the switching element 205 is turned ON and OFF based on the result of comparing a voltage detected and output by the current transformer, with a reference voltage using a comparator. In this configuration, the ON/OFF operation of the switching element 205 can be automatically controlled without being placed under control of the CPU.

(Example Applications of Switching Power Supply)

The switching power supply according to the above-described first and second exemplary embodiments is applicable to a low-voltage power supply in an image forming apparatus such as a laser beam printer, a copying machine, and a facsimile. Example applications will be described below. The switching power supply is applicable as a power supply for supplying the electric power to motors (drive units of conveying rollers for conveying paper), actuators, and a controller in the image forming apparatus.

FIG. 18A is a schematic view illustrating a configuration of a laser beam printer 200 as an example image forming apparatus. The laser beam printer 200 includes a photosensitive drum 211 (an image formation unit 210) which is an image bearing member for forming a latent image thereon, and a development unit 212 for developing the latent image formed on the photosensitive drum 211 by using toner. Then, a toner image developed on the photosensitive drum 211 is transferred onto a sheet (not illustrated) supplied as a recording medium from a cassette 216, and the toner image transferred onto the sheet is fixed by a fixing device 214, and then the sheet is discharged onto a tray 215.

FIG. 18B illustrates power supply lines from a switching power supply to motors (drive units) and a controller in the image forming apparatus 200. The above-described switching power supply is applicable as a low-voltage power supply for supplying the electric power to a controller 217 including a CPU 218 for controlling the above-described image forming operations and to motors 219 and 220 (drive units for image formation). The switching power supply supplies, for example, a 24-V power voltage to the motors 219 and 220. For example, the motor 219 drives a conveying roller for conveying a sheet, and the motor 220 drives the fixing device 214. The switching power supply supplies, for example, a 5-V power voltage to the controller 217.

The image forming apparatus 200 such as a laser beam printer can be switched between an operating state in which an image is formed onto a recording material and a non-operating state (also referred to as standby or power saving state) in which image formation is not performed and power supply to motors, etc. are stopped to reduce power consumption. For example, when the image forming apparatus 200 is switched to the non-operating state, if the above-described switching power supply is used, power consumption of the image forming apparatus 200 can be further reduced in the non-operating state, and in addition, mis-detection of overload (overcurrent) can be prevented. The switching power supply according to the above-described first and second exemplary embodiments is applicable as a low-voltage power supply not only to the above-described image forming apparatus 200 but also to other electronic devices.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-115860 filed May 24, 2011, which is hereby incorporated by reference herein in its entirety.

What is claimed is:

1. A switching power supply comprising:
    a transformer of which a primary side and a second side are insulated;
    a switching unit configured to connect to the primary side of the transformer;
    a control unit configured to control a switching operation of the switching unit; and
    a first detection unit configured to detect as a first voltage signal a current flowing through the primary side of the transformer and outputs the first voltage signal to the control unit, and
    a second detection unit configured to output a second voltage signal obtained by correcting the first voltage signal output from the first detection unit, to the control unit,
    wherein, in a case where the first voltage signal detected by the first detection unit is less than a threshold value, the voltage is output to the control unit from the first detection unit without passing through the second detection unit, and
    wherein, in a case where the first voltage signal detected by the first detection unit is equal to or more than a threshold value, the second voltage signal being corrected by the second detection unit is output to the control unit.

2. The switching power supply according to claim 1, wherein the switching unit operates in two different operating states including a light load state where the transformer outputs a low voltage and the switching unit operates at a low frequency, and a regular load state where the transformer outputs a higher voltage and the switching unit operates at a higher frequency than in the light load state, and
    wherein, in the light load state, the first voltage signal detected by the first detection unit is less than a threshold value, and
    wherein, in the regular load state, the first voltage signal detected by the first detection unit is equal to or more than a threshold value.

3. The switching power supply according to claim 1, wherein the switching unit operates in two different operating states including a light load state where the transformer outputs a low voltage and the switching unit operates at a low frequency, and an overload state where the transformer outputs a higher voltage and the switching unit operates at a higher frequency than in the light load state,
    wherein, in the light load state, the first voltage signal detected by the first detection unit is less than a threshold value, and
    wherein, in the overload state, the first voltage signal detected by the first detection unit is equal to or more than a threshold value.

4. The switching power supply according to claim 1, wherein the second detection unit is a detecting circuit including a plurality of resistors connected to the switching unit and a diode, and switches the voltage to be supplied to the control unit by a forward voltage of the diode.

5. The switching power supply according to claim 4, wherein the detecting circuit is formed of a first resistor for detecting a current flowing through the primary winding of the transformer, and a second and third resistor and a diode serially connected, which are connected in parallel with the first resistor, and
    wherein the detecting circuit supplies a voltage value between the second and third resistors to the control unit.

6. The switching power supply according to claim 1, wherein the second detection unit is a detecting circuit including a plurality of resistors connected to the switching unit and a switching element, and switches the voltage to be supplied to the control unit by turning the switching element ON and OFF.

7. The switching power supply according to claim 4,
    wherein the detecting circuit is formed of a first resistor for detecting a current flowing through the primary winding of the transformer, and a second and third resistor and a switching element serially connected, which are connected in parallel with the first resistor, and
    wherein the detecting circuit supplies a voltage value between the second and third resistors to the control unit.

8. An image forming apparatus comprising:
    an image forming unit configured to form an image on a recording material;
    a controller configured to control the operation of the image forming unit; and
    a switching power supply configured to output a voltage to the controller,
    wherein the switching power supply comprises:
        a transformer of which a primary side and a second side are insulated;
        a switching unit configured to connect to the primary side of the transformer;
        a control unit configured to control a switching operation of the switching unit; and
        a first detection unit configured to detect as a first voltage signal a current flowing through the primary side of the transformer and outputs the first voltage signal to the control unit, and
        a second detection unit configured to output a second voltage signal voltage obtained by correcting the first voltage signal output from the first detection unit, to the control unit,
    wherein, in a case where the first voltage signal detected by the first detection unit is less than a threshold value, the first voltage signal is output to the control unit from the first detection unit without passing through the second detection unit, and wherein, in a case where the first voltage signal detected by the first detection unit is equal to or more than a threshold value, the second voltage signal being corrected by the second detection unit is output to the control unit.

9. The switching power supply according to claim 1, wherein the switching unit operates in two different operating states including a light load state where the transformer outputs a low voltage and the switching unit operates at a low frequency, and a regular load state where the transformer outputs a higher voltage and the switching unit operates at a higher frequency than in the light load state, and wherein, in the light load state, the first voltage signal detected by the first detection unit is less than a threshold value, and wherein, in the regular load state, the first voltage signal detected by the first detection unit is equal to or more than a threshold value.

10. The switching power supply according to claim 1, wherein the switching unit operates in two different operating states including a light load state where the transformer outputs a low voltage and the switching unit operates at a low frequency, and an overload state where the transformer outputs a higher voltage and the switching unit operates at a higher frequency than in the light load state, wherein, in the light load state, the first voltage signal detected by the first detection unit is less than a threshold value, and wherein, in the overload state, the first voltage signal detected by the first detection unit is equal to or more than a threshold value.

11. The image forming apparatus according to claim 8, wherein the second detection unit is a detecting circuit including a plurality of resistors connected to the switching unit and a diode, and switches the voltage to be supplied to the control unit by a forward voltage of the diode.

12. The image forming apparatus according to claim 11, wherein the detecting circuit is formed of a first resistor for detecting a current flowing through the primary winding of the transformer, and a second and third resistor and a diode serially connected, which are connected in parallel with the first resistor, and wherein the detecting circuit supplies a voltage value between the second and third resistors to the control unit.

13. The image forming apparatus according to claim 8, wherein the second detection unit is a detecting circuit including a plurality of resistors connected to the switching unit and a switching element, and switches the voltage to be supplied to the control unit by turning the switching element ON and OFF.

14. The image forming apparatus according to claim 11, wherein the detecting circuit is formed of a first resistor for detecting a current flowing through the primary winding of the transformer, and a second and third resistor and a switching element serially connected, which are connected in parallel with the first resistor, and wherein the detecting circuit supplies a voltage value between the second and third resistors to the control unit.

15. The image forming apparatus according to claim 8, wherein, in a standby state that a power consumption of the image forming apparatus is reduced, the first voltage signal detected by the first detection unit is less than a threshold value.

* * * * *